United States Patent
Kang et al.

(10) Patent No.: US 9,563,392 B2
(45) Date of Patent: Feb. 7, 2017

(54) APPARATUS AND METHOD FOR DISPLAYING IMAGES FOR DIFFERENT ACCOUNTS

(75) Inventors: Haengjoon Kang, Seoul (KR); Kyungjin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 557 days.

(21) Appl. No.: 13/366,993

(22) Filed: Feb. 6, 2012

(65) Prior Publication Data

US 2012/0327110 A1   Dec. 27, 2012

(30) Foreign Application Priority Data

Jun. 21, 2011   (KR) .................. 10-2011-0060253

(51) Int. Cl.
  *G06F 3/14*    (2006.01)
  *G06Q 50/00*   (2012.01)
  *G09G 5/14*    (2006.01)

(52) U.S. Cl.
  CPC .............. *G06F 3/14* (2013.01); *G06Q 50/01* (2013.01); *G09G 5/14* (2013.01); *G09G 2370/10* (2013.01)

(58) Field of Classification Search
  CPC ......... G06T 15/30; G06T 7/0097; G06T 13/80
  See application file for complete search history.

(56) References Cited

U.S. PATENT DOCUMENTS

| | | | |
|---|---|---|---|
| 2005/0265620 A1* | 12/2005 | Hung | 382/254 |
| 2006/0036945 A1* | 2/2006 | Radtke et al. | 715/708 |
| 2006/0093310 A1* | 5/2006 | Hung | 386/46 |
| 2006/0242581 A1 | 10/2006 | Manion et al. | |
| 2007/0099659 A1* | 5/2007 | Borquez et al. | 455/556.2 |
| 2007/0141980 A1* | 6/2007 | Lee et al. | 455/3.06 |
| 2008/0019494 A1* | 1/2008 | Toda | 379/142.16 |

(Continued)

FOREIGN PATENT DOCUMENTS

| | | |
|---|---|---|
| KR | 10-2008-0008319 A | 1/2008 |
| KR | 10-2008-0101062 A | 11/2008 |
| KR | 10-2008-0101064 A | 11/2008 |

OTHER PUBLICATIONS

Denise Leung, "Flickr + Facebook!", Flickr Blog, Jun. 10, 2010, http://blog.flickr.net/en/2010/06/10/flickr-facebook/.*

(Continued)

*Primary Examiner* — Abderrahim Merouan
*Assistant Examiner* — Sarah Le
(74) *Attorney, Agent, or Firm* — Birch, Stewart, Kolasch & Birch, LLP

(57) ABSTRACT

An image display method and apparatus for displaying images provided by a plurality of different accounts are discussed. According to an embodiment, the method includes displaying a plurality of areas on a screen of the display unit by splitting the entire screen of the display unit into the plurality of areas; displaying a first image from a first account among the plurality of different accounts, on a first area among the displayed plurality of areas of the screen; displaying first account information of the first account with the first image, on the first area of the screen; determining, by the apparatus, whether or not an updated image from the first account exists, after a first predetermined time has elapsed since the first image has been displayed; and displaying the updated image as a second image for the first account on the first area when the updated image exists.

24 Claims, 34 Drawing Sheets

(56) References Cited

U.S. PATENT DOCUMENTS

2010/0073565 A1* 3/2010 Hwang et al. ..... H04N 5/44591
　　　　　　　　　　　　　　　　　　　　　　348/564
2010/0321527 A1* 12/2010 Van Schalkwyk ......... 348/231.2
2011/0265017 A1* 10/2011 Stovicek et al. ....... G06Q 10/10
　　　　　　　　　　　　　　　　　　　　　　715/752

OTHER PUBLICATIONS

Duncan Geere, "Facebook adding filters to news feed", TechDigest, Aug. 13, 2008, http://www.techdigest.tv/2008/08/facebook_adding.html.*

Amix, "Announcing the Super-Duper, Super-Fun, Plurk Flash Widget", Plurk Labs-news about plurkland, Sep. 29, 2008, http://en.blog.plurk.com/2008/09/29/announcing-the-super-duper-super-fun-plurk-flash-widget/.*

* cited by examiner

FIG.34

| arrangement sequence | | Area number | image conversion time | pointer location time |
|---|---|---|---|---|
| ☐ | family | | | |
| ☐ | relative | | | |
| ☐ | high school | 6 | 3second | 0.03second |
| ☐ | department classmate | | | |
| ☐ | close friend | | | |
| ☑ | sequence of large update number | | | |

910 — arrangement sequence
900
920 — Area number
930 — image conversion time
940 — pointer location time

APPARATUS AND METHOD FOR DISPLAYING IMAGES FOR DIFFERENT ACCOUNTS

CROSS REFERENCE TO RELATED APPLICATION

This application claims under 35 U.S.C. §119 the priority benefit of Korean Patent Application No. 10-2011-0060253, filed on Jun. 21, 2011, entitled "IMAGE DISPLAY METHOD AND VIDEO DISPLAY APPARATUS USING THE SAME", which is hereby incorporated by reference in its entirety into this application.

BACKGROUND OF THE INVENTION

1. Technical Field

The present invention relates to an image display method and image display apparatus using the same and more particular, to a method capable of providing an image for a plurality of accounts to users and utilizing the image according to a movement and a selection of a pointer.

2. Description of the Related Art

Recently, digital TV services using wired or wireless communication networks are more common. The digital TV services can provide various services which have not been provided in the existing analog broadcasting services.

For example, an Internet Protocol Television (IPTV) service that is one type of the digital TV services is a bidirectional service which allows a user to actively select the kind, viewing time, or the like of a program to be watched. The IPTV service can provide various additional services, such as the Internet search, home shopping, on-line games, or the like, based on the bidirectional service capability.

SUMMARY OF THE INVENTION

The present invention is directed to providing an image for a plurality of accounts to the user(s) using an image display apparatus.

An object of the present invention provides an apparatus and method for displaying images for different accounts, which address the limitations and disadvantages associated with the related art.

In a method for displaying an image provided by a plurality of accounts on a display unit, an image display method according to an embodiment of the present invention can include driving a picture (or image) provision application according to a user's key input, displaying by splitting the entire screen of the display unit into a plurality of areas according to the driving of the picture provision application, displaying a first image for a first account of a plurality of accounts on a first area of the plurality of areas, after a first time has elapsed, confirming whether or not an image updated for the first account exists, and displaying a second image for the first account on the first area when the updated image exists.

An image display apparatus according to an embodiment of the present invention can include a network interface which receives an image provided by a plurality of accounts, a control unit which extracts a plurality of images received through the network interface, a storage unit which stores the plurality of extracted images, and a display unit which displays the plurality of images, and the control unit which controls such that the entire screen of the display unit is split and displayed into a plurality of areas, a first image for a first account of a plurality of accounts is displayed on a first area of the plurality of areas, and after a first time has elapsed, when an image updated for the first account exists, a second image for the first account is displayed on the first area.

Meanwhile, the image display methods of the present invention may be implemented with at least one computer readable recording medium have recorded thereon computer program(s) executable by a computer or the like.

According to an embodiment, the invention provides an image display method for displaying images provided by a plurality of different accounts on a display unit of an image display apparatus, the method including displaying a plurality of areas on a screen of the display unit by splitting the entire screen of the display unit into the plurality of areas; displaying a first image from a first account among the plurality of different accounts, on a first area among the displayed plurality of areas of the screen; displaying first account information of the first account with the first image, on the first area of the screen; determining, by the apparatus, whether or not an updated image from the first account exists, after a first predetermined time has elapsed since the first image has been displayed; and displaying the updated image as a second image for the first account on the first area when the updated image exists.

According to an embodiment, the invention provides an image display apparatus for displaying images provided by a plurality of different accounts, the image display apparatus including a display unit including a screen; and a control unit configured to control the display unit and to: display a plurality of areas on the screen of the display unit by splitting the entire screen of the display unit into the plurality of areas; display a first image from a first account among the plurality of different accounts, on a first area among the displayed plurality of areas of the screen; display first account information of the first account with the first image, on the first area of the screen; determine whether or not an updated image from the first account exists, after a first predetermined time has elapsed since the first image has been displayed; and display the updated image as a second image for the first account on the first area when the updated image exists.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 34 is a diagram showing an example of a user's setting menu for the image display method according to the embodiments of the present invention.

DESCRIPTION OF THE PREFERRED EMBODIMENTS

Hereinafter, the preferred embodiments of the present invention will be described with reference to accompanying drawings in detail.

An 'image' in the present invention can include a video, a still picture, contents, data, etc., such as a still picture, a moving video/clip, texts, an icon, a menu, a symbol, a 3D image, a pop-up window, etc.

Figure 1:
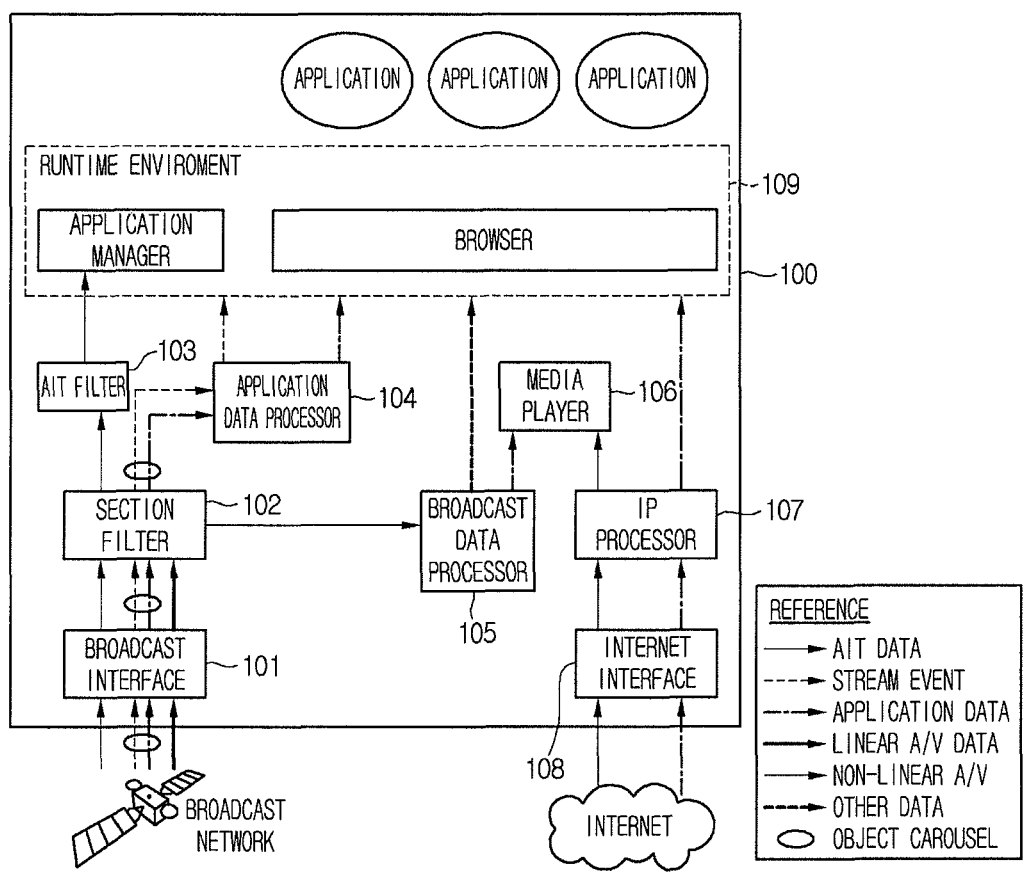
FIG. 1 is a diagram schematically showing a first example of the configuration of an image display apparatus according to embodiments of the present invention.

FIG. 1 is a diagram schematically showing a first example of a system in which an image display apparatus 100 according to an embodiment of the present invention is connected with a broadcast network and/or an internet network.

Referring to FIG. 1, the image display apparatus 100 may include a broadcast interface 101 for communicating with a broadcast network, a section filter 102, an AIT filter 103, an application data processing unit (or processor) 104, a broadcast data processing unit (or processor) 105 for processing broadcast contents, a media player 106 for recording and/or reproducing images, an internet protocol processing unit (or processor) 107, an internet interface 108 for communicating with the Internet or other networks, and a run time module 109. The run time module 109 may include an application manager, a web browser, etc. The image display apparatus 100 includes a display unit which may be part of the media player 106 or may be a separate unit, and can display various contents including broadcast/TV contents, web-associated contents, etc. One or more processors of the image display apparatus 100 of FIG. 1 can operate as a control unit, or a separate controller may be provided to control the operations of the apparatus 100. The image display apparatus 100 may include other known components. All components of the image display apparatus 100 of FIG. 1 are operatively coupled and configured.

Figure 2:
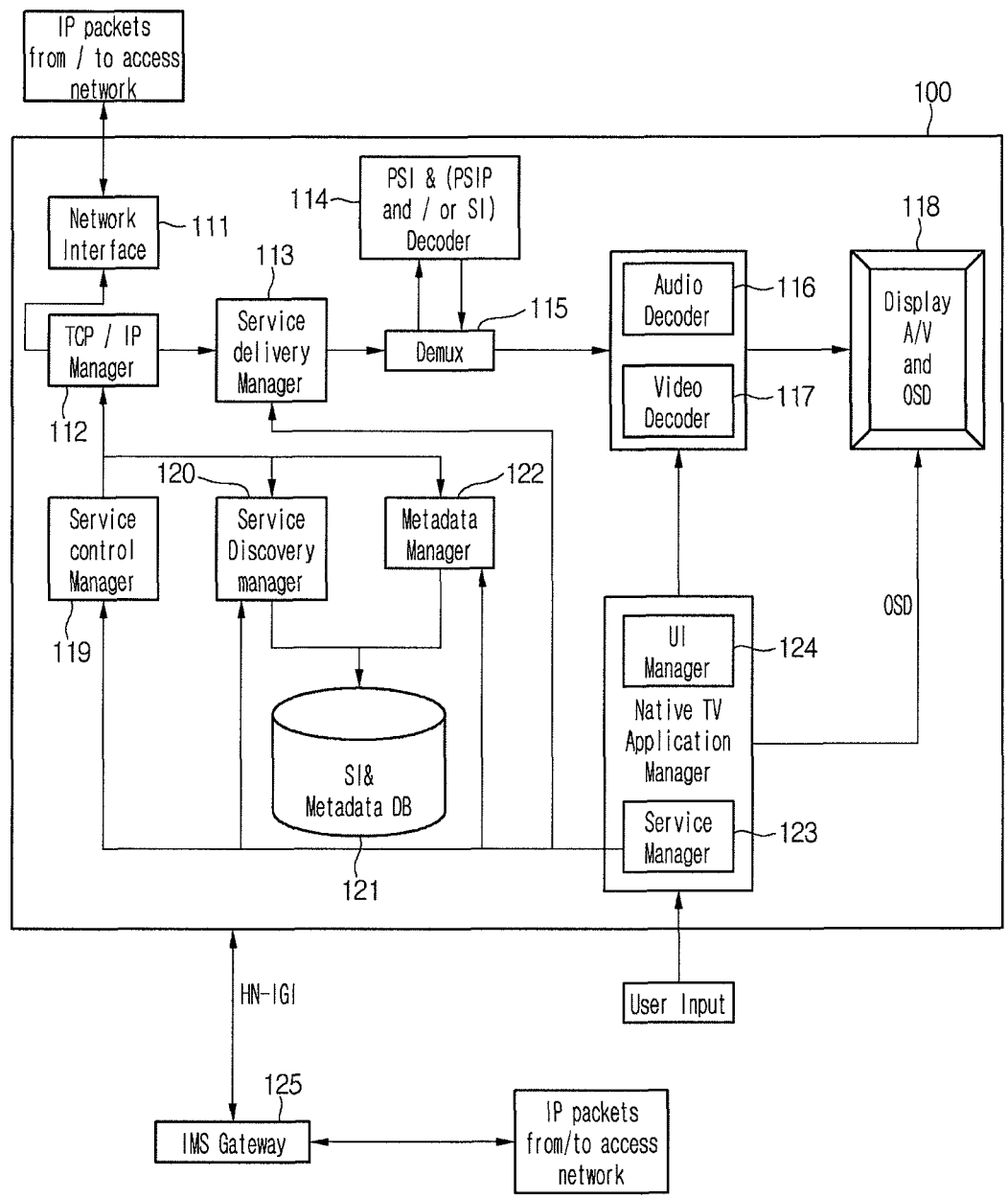
FIG. 2 is a block diagram showing a second example of the configuration of an image display apparatus according to the embodiments of the present invention.

FIG. 2 is a block diagram showing a second example of the configuration of an image display apparatus 100 according to an embodiment of the present invention.

Referring to FIG. 2, the image display apparatus 100 may include a network interface unit 111, a TCP/IP Manager 112, a service delivery manager 113, a de-multiplexer (Demux) 115, a PSI & (PSIP and/or SI) decoder 114, an audio decoder 116, a video decoder 117, a display A/V and OSD module (display unit) 118, a service control manager 119, a service discovery manager 120, a metadata manager 122, a SI & Metadata database (DB) 121, an UI manager 124 and a service manger 123. The image display apparatus 100 may include other known components. All components of the image display apparatus 100 of FIG. 2 are operatively coupled and configured.

The network interface unit 111 may receive and transmit packets from and to the network terminal such as a server or another terminal. For instance, the network interface unit 111 may receive services and contents, and the like from the service provider through the network terminal. The image display apparatus 100 may also communicate with an IMS gateway 125 for transmitting and receiving IP packets and other data via a network or another terminal.

Meanwhile, the UI manger 124 and the service manger 123 manage the overall state of the image display apparatus 100, provides a user interface, and manages other manager(s). As such, the UI manager 124 and/or the service manager 123 can be considered a control unit for controlling the operations of the apparatus 100 including the display unit 118. For example, the UI manager 124 provides a graphic user interface (GUI) for the user by using the on screen display (OSD), and may perform the operation of the receiver according to a key input from the user. In addition, when the UI manger 124 receives the key input with regard to the channel selection from the user, the UI manager 124 may transmit the key input signal to service manager 123.

Figure 3:
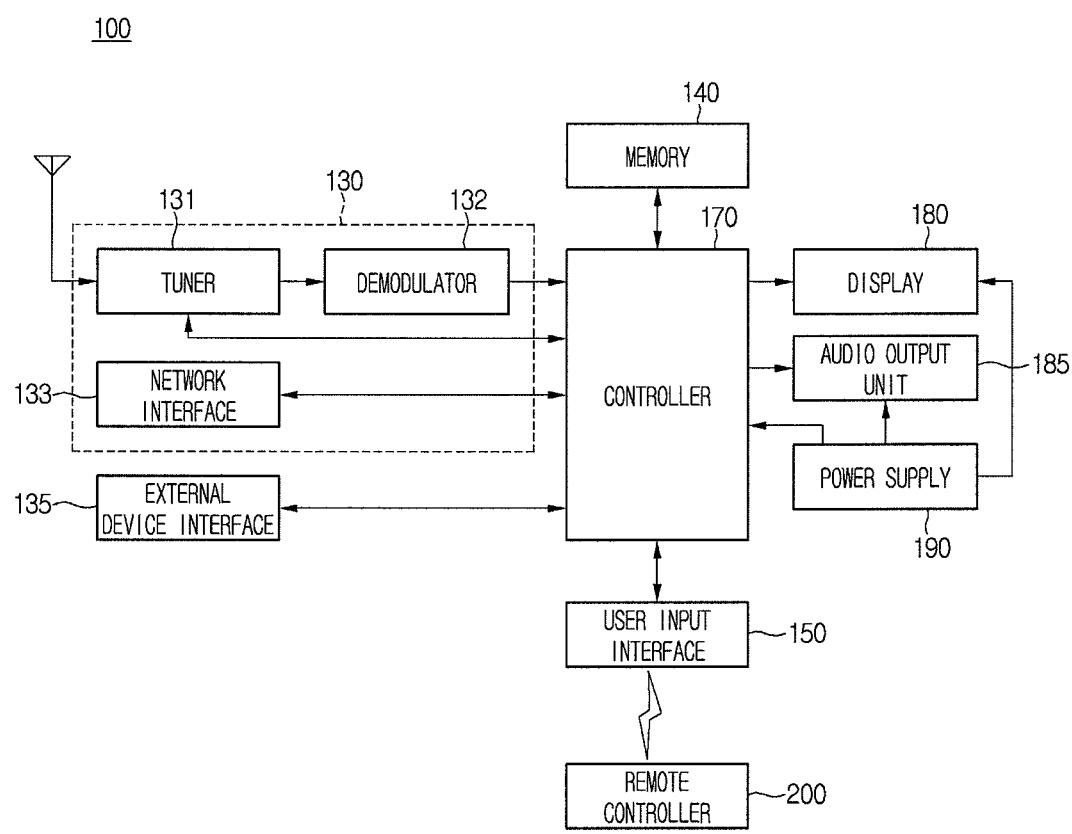
FIG. 3 is a block diagram showing a third example of the configuration of an image display apparatus according to another embodiment of the present invention.

FIG. 3 is a block diagram showing a third example of the configuration of an image display apparatus 100 according to an embodiment of the present invention.

Referring to FIG. 3, the image display apparatus 100 may include a broadcast receiving unit 130, an external device interface unit 135, a memory or storage unit 140, a user input interface unit 150, a control unit 170, a display unit 180, an audio output unit 185 and a power supply 190. Meanwhile, the broadcast receiving unit 130 may include a tuner 131, a demodulator 132 and a network interface unit 133. The image display apparatus 100 may include other known components. All components of the image display apparatus 100 of FIG. 3 are operatively coupled and configured.

The external interface unit 135 may receive applications or application lists from or through the external devices and transmit the received applications or application lists to the control unit 170 or the storage unit 140.

The network interface unit 133 may provide an interface for connecting the image display apparatus 100 to a wired or wireless network including the Internet network. The network interface unit 133 may transmit or receive data to and from another user or another electronic device through a connected network or another network linked to the connected network.

In addition, a portion of content data stored in the image display apparatus 100 may be transmitted to a selected user or a selected electronic device among another user or another electronic device already registered in the image display apparatus 100.

The network interface unit 133 may access a predetermined Web page through a connected network or another network linked in the connected network. For instance, by connecting to the predetermined Web page through the network, data may be transmitted or received to or from the corresponding server.

In addition, the network interface unit 133 may receive contents or data provided by content providers or network operators. For instance, the network interface unit 133 may receive contents such as movies, advertising, games, VOD, broadcast signals, and the like and information associated with the contents, which are provided by content providers or network operators, through the network.

In addition, the network interface unit 133 may receive update information or update files of firmware provided by network operators, and transmit any data or other contents to the content providers or network operators.

The network interface unit 133 may select and receive desired applications of opened applications in the air through the network.

The storage unit 140 may store programs for processing and controlling each of the signals in the control unit 170 and store the processed video, audio and data signals.

Further, the storage unit 140 may temporarily serve to store video, audio and/or data signals input from the external interface unit 135 or the network interface unit 133 and store information associated with the predetermined image through the channel memory function(s).

The storage unit 140 may store applications or application lists received from the external interface unit 135 or the network interface unit 133.

The image display apparatus 100 may reproduce content files or data (e.g., moving video files, still video files, music files, document files, application files, etc.) stored in the storage unit 140 and provide the reproduced content files to the users.

The user input interface unit 150 may transmit input signals input by the user to the control unit 170 or transmit the signals from the control unit 170 to the user. For example, the user input interface unit 150 may process to receive control signals such as power on/off, channel selection, screen setting, volume switching, selection signals, and the like from a remote control device 200 according to various communication standards such as the radio frequency (RF) communication standard or the infrared (IR) communication standard or the like, or process to transmit control signals from the control unit 170 to the remote control device 200. The user can input commands and other signals to the image display apparatus 100 using the remote control device 200.

In addition, the user input interface unit 150 may transmit the control signals input from a local key such as a power key, a channel key, a volume key, a setting key, and the like to the control unit 170. Such control signals may be input via the remote control device 200 or other input unit such as a keyboard, a touch pad, a keypad, etc.

The processed video/image signals in the control unit 170 may be output to the display unit 180, and displayed as an image corresponding to the image signals. Further, the processed video/image signals from the control unit 170 may be output to the external output device through the external interface unit 135.

Further, the processed audio signals from the control unit 170 may be output to the audio output unit 185 for providing an audio output to the user. Further, the processed audio signals from the control unit 170 may be output to the external output device through the external interface unit 135.

In addition, the control unit 170 may control the overall operation within the image display apparatus 100. Further, the control unit 170 may control the image display apparatus 100 by the user command input through the user input interface unit 150 or an internal program. Further the control unit 170 may access a network so that the user may download desired applications or application lists into the image display apparatus 100.

The control unit 170 may serve to output channel information, and the like selected by the user together with the processed video or audio signals through the display unit 180 or the audio output unit 185.

In addition, the control unit 170 may serve to output the video or audio signals from the external devices, which is a camera or camcorder, received through the external interface unit 135, through the display unit 180 or the audio output unit 185, according to the external video reproducing command received through the user input interface unit 150.

Meanwhile, the control unit 170 may control the display unit 180 to display images including videos. For example, the control unit 170 may control so as to display a broadcasting image including videos input through the tuner 131, or an external input image including videos input through the external interface unit 135, or an image input including videos through the network interface unit, or an image including videos stored in the storage unit 140 on the display unit 180. In this case, the images displayed on the display unit 180 may be moving videos or still videos or pictures, or 2D or 3D videos.

In addition, the control unit 170 may control to reproduce contents stored in the image display apparatus 100, or received broadcast contents, and external input contents input from the outside. The contents may be in various forms such as broadcast images, external input videos, audio files, still videos, a connected web screen, and a document file.

The display unit 180 may generate driving signals by converting various signals including video signals, data signals, OSD signals processed from the control unit 170 or video signals, data signals, and the like received from the external interface unit 135 into R, G, B signals, respectively.

Meanwhile, since the image display apparatuses 100 as shown in FIGS. 1, 2 and 3 are examples of the present invention, some of shown components may be integrated, added or omitted, depending on certain aspects of the actually implemented image display apparatus 100.

For example, the image display apparatus 100 may be configured to integrate two or more components into one component or subdivide one component into two or more components, as necessary. In addition, since the functions performed by each block are intended to describe an embodiment of the present invention, the scope of rights of the present invention is not limited to the specific operation or devices.

In the example of FIG. 3, according to another embodiment of the present invention, the image display apparatus 100 may receive and reproduce images including videos through the network interface unit 133 or the external interface unit 135 without including the tuner 131 and demodulator 132.

For example, the image display apparatus 100 may be separately implemented by the image processing device such as set-top boxes for receiving contents according to the broadcast signal or various network services and content reproducing device to reproduce contents input from the image processing apparatus.

In this case, an image display method, according to an embodiment of the present invention to be described below, may be performed by any one of an image processing device such as the separated set-top box or a content reproducing device including the display unit 180 and the audio output unit 185, as well as the image display apparatus 100 as described with reference to FIG. 3.

The image display apparatus 100 in FIGS. 1-3 can display various images. The image display apparatus 100 in FIGS. 1-3 can also output audio data independently or in association with the images being displayed by the apparatus 100. Further, the image display apparatus 100 in FIGS. 1-3 can communicate with other devices via a network and can display contents received therethrough. The image display apparatus 100 in FIGS. 1-3 may also be smart TVs, 3D TVs, multimedia devices, computers, tables, laptops, mobile terminals like smart phones, etc.

Hereinafter, the image display methods according to the embodiments of the present invention will be described with reference to FIGS. 4 to 34. These methods and their variations can be implemented using the image display apparatus 100 of FIG. 1, 2 or 3, or can be implemented using other suitable device. For the sake of brevity, however, these methods are described below as being implemented by the image display apparatus 100 of FIG. 3.

Figure 4:
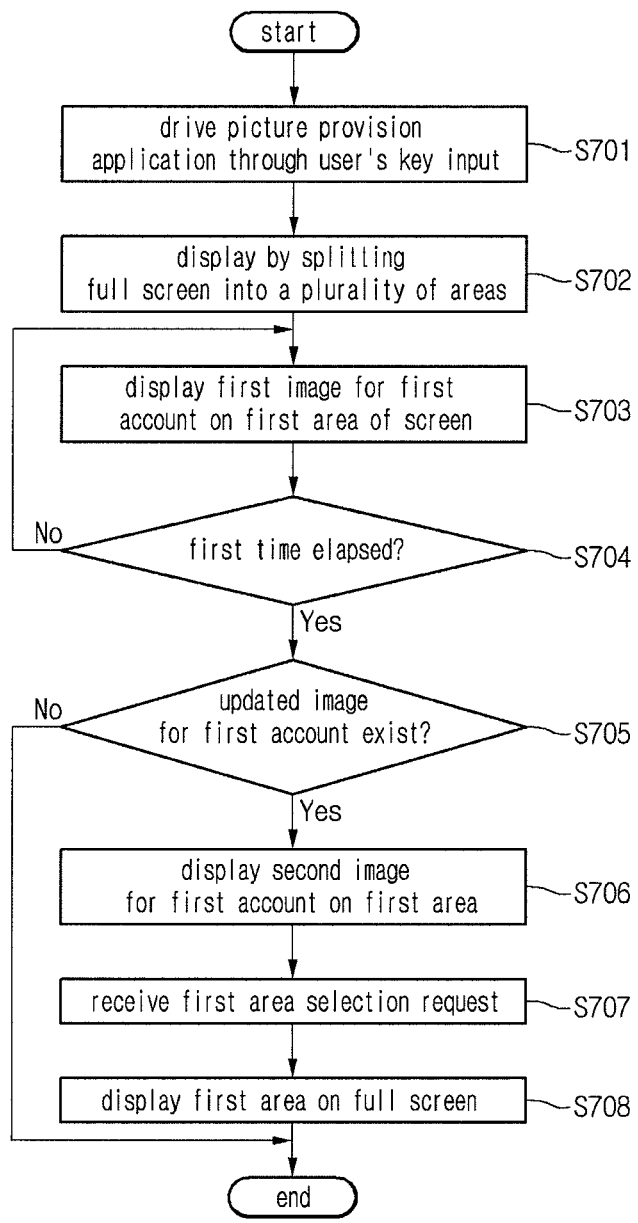
FIGS. 4, 9 and 13 are flow charts showing a method for displaying an image on the image display apparatus according to the embodiments of the present invention.

FIG. 4 is a flow chart of the image display method according to an embodiment of the present invention, and FIGS. 5 to 8 are diagrams showing the image display method of the image display apparatus according to the embodiment of the present invention.

Referring to FIG. 4, after turning on the image display apparatus 100, the control unit 170 drives a picture provision application through a user input unit such as the remote control device 200 or other unit (S701). The picture provision application may be provided by a content provider.

The content provider may include a server for storing various type of contents such as created texts or uploaded images in the social network site (SNS) by a plurality of accounts.

The user input unit associated with the image display apparatus 100 may include a keypad, a buttons, a touch pad or touch screen, and the like. The user may input commands associated with the image display apparatus 100 to the user input unit directly or to the remote control device 200 by operating the user input unit.

Figure 5:
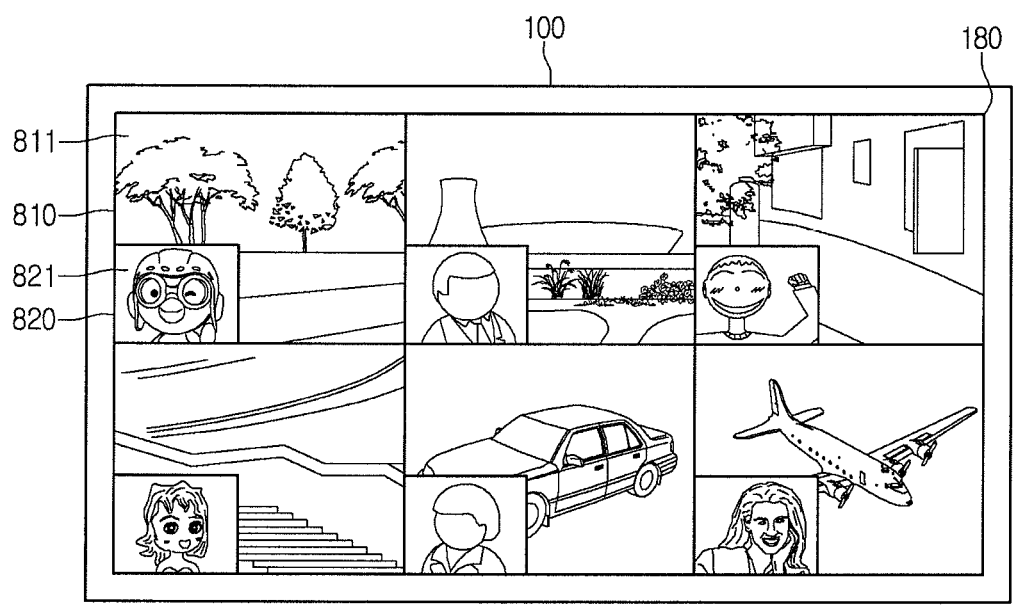
FIGS. 5 to 8, 10 to 12, and 14 to 33 are diagrams showing examples of the image display method of the image display apparatus according to the embodiments of the present invention.

Referring to FIG. 5, the control unit 170 may split and display the full screen of the display unit 180 into a plurality of areas according to the driving of the picture provision application (S702). The number of the plurality of areas here may be set to match the number of areas 920 set in a user setting menu 900 as shown in FIG. 34 according to the operation of the user input unit. Further, one or more different accounts may be previously set up and such information may be provided to the image display apparatus 100 from a server, another device, or via other means. The accounts may be set up under a service such as a social network service via the Internet or other network.

A first image 811 for a first account among a plurality of different accounts may be displayed on a first area 810 of the plurality of areas (S703). The first account may mean specific person or people as one of the plurality of accounts registered by a user. The first image 811 can be provided and updated by the first account. For instance, the image display apparatus 100 may download and display an image from or associated with the first account through the SNS service or network.

A first account image 821 may be further displayed on a portion area 820 of the first area 810. The first account image 821, which can be an image uploaded in a social network service SNS by the first account (first account's user), may be an image for distinguishing the first account from other accounts when viewed. The first account image 821 may be any image or information that is displayed and/or audibly output for identifying or recognizing the first account. Such account information may identify the user or owner of the first account or may provide some data associated with the owner of the first account.

In this regard, the user connects to the server of the content provider providing the SNS service by using the image display apparatus 100 and specifies a plurality of registered accounts, such that the user may confirm the uploaded image by the plurality specified accounts.

Figure 6:
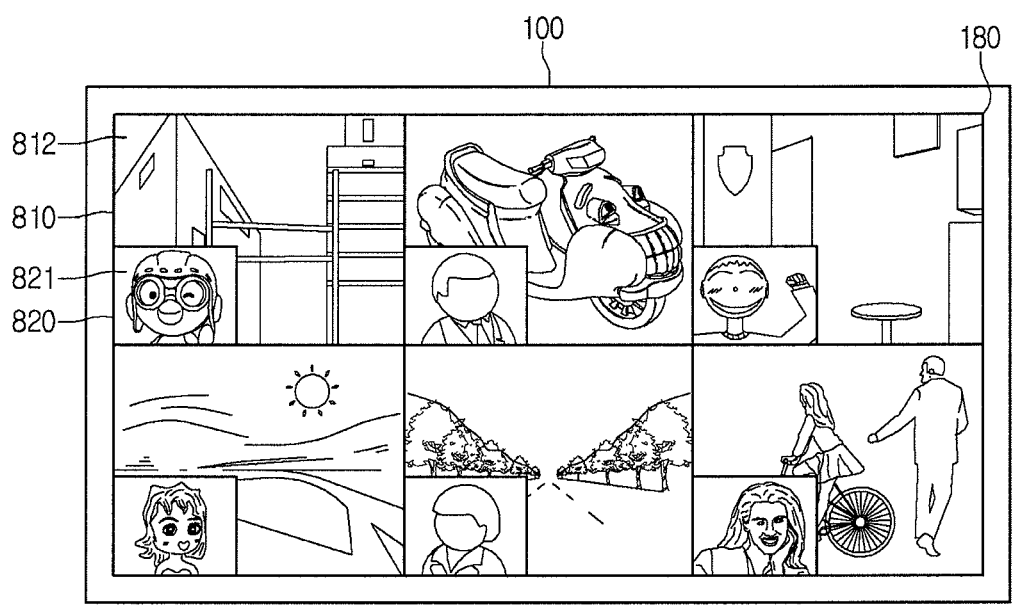

Referring to FIGS. 5 and 6, the control unit 170 can determine whether or not a first time has elapsed in a state where the first image 811 is displayed on the first area 810 (S704). The first time can be a predetermined time duration, which can be set or modified by the user or can be set by the control unit 170. When the first time has elapsed as a result of the determination, the control unit 170 can confirm whether or not an updated image for the first account exists (S705). If the updated image for the first account exists, the control unit 170 may display a second image 812 for the first account on the first area 810 (S706). For instance, the updated image from the first account is displayed as the second image 812 in FIG. 6 on the first area 810 by replacing the first image 811 of FIG. 5. The first time can be variable according to the operation of the user input unit in the user setting menu 900. The user may successively confirm images for the first account by a desired amount of time by adjusting the first time. After the first time, the first account image 821 may be maintained and displayed as it is while the second image 812 is displayed on the first area 810.

The update time of the first image 811 may be faster than the update time of the second image 812. For instance, a sequence that the first image 811 and the second image 812 are displayed may be a sequence uploaded on the social network service (SNS) by the first account (e.g., first account's user/holder).

Figure 7:
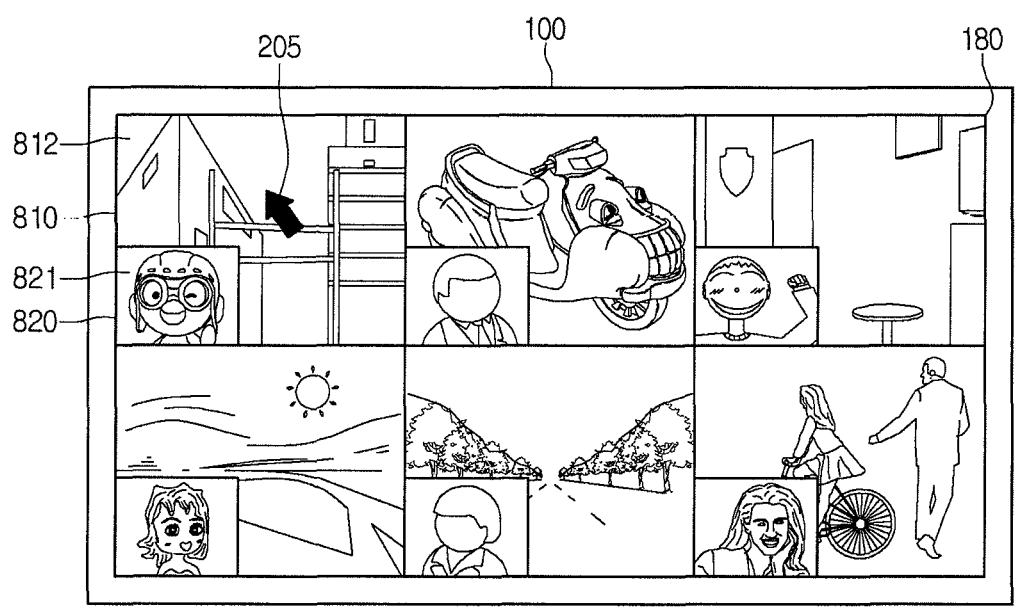
Figure 8:
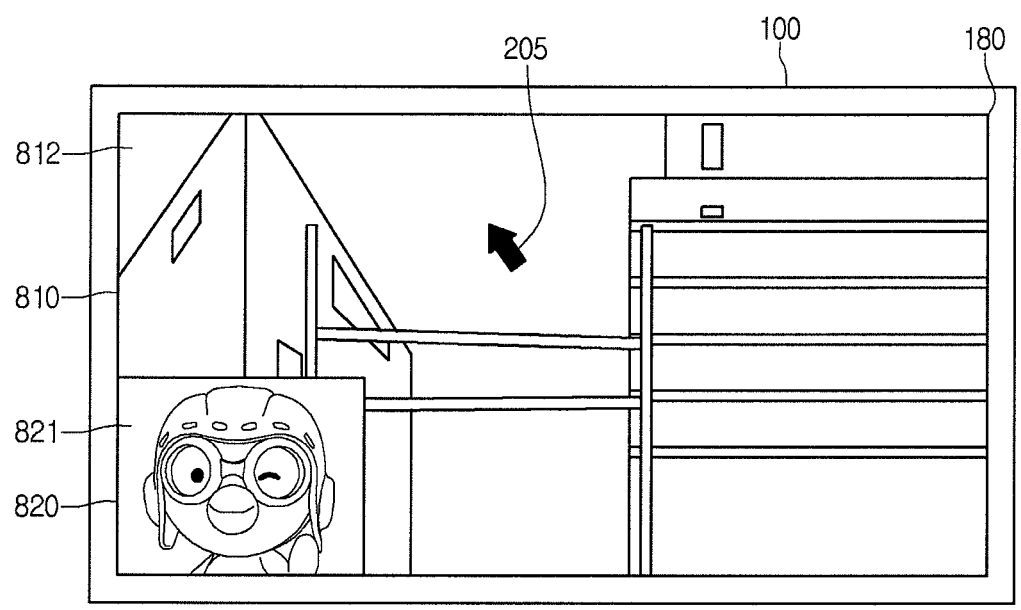

Referring to FIGS. 7 and 8, the user of the image display apparatus 100 can request a selection of the first area 810 through the user input unit (S707). The image display apparatus 100 may enlargedly display the first area 810 as the full screen according to the user's the selection request (S708). In the example of FIG. 7, when the user selects the first area 810 or the second image 812 using a pointer 205 or other selection unit, the second image 812 according to the selection is enlarged and displayed on the entire screen of the display unit 180 as shown in FIG. 8. Another selection of the enlarged image 812 can return the screen back to the screen of FIG. 7. Further, as a variation, the user can select the displayed first account image 821 using the pointer 205 or the like in FIG. 7 or 8, which then can be enlarged and displayed on the entire screen. Thus the user can easier view and focus on the images from a particular account and/or the account information associated with the particular account, if desired.

In the method of FIG. 7 and the methods of FIGS. 9 and 13 (to be discussed later), each one of the plurality of divided areas of the screen of the display unit 180 can display images from a different account among the plurality of accounts. After a predetermined determined time has elapsed, these images may be replaced by updated/new images for each account, if such images exist. All the divided areas of the screen may switch to display the updated/new images from the different accounts at the same time, or at different times. Further, in each of the divided areas of the screen, a set of different images from the corresponding account may be displayed sequentially automatically or according to the user's setting.

Figure 9:
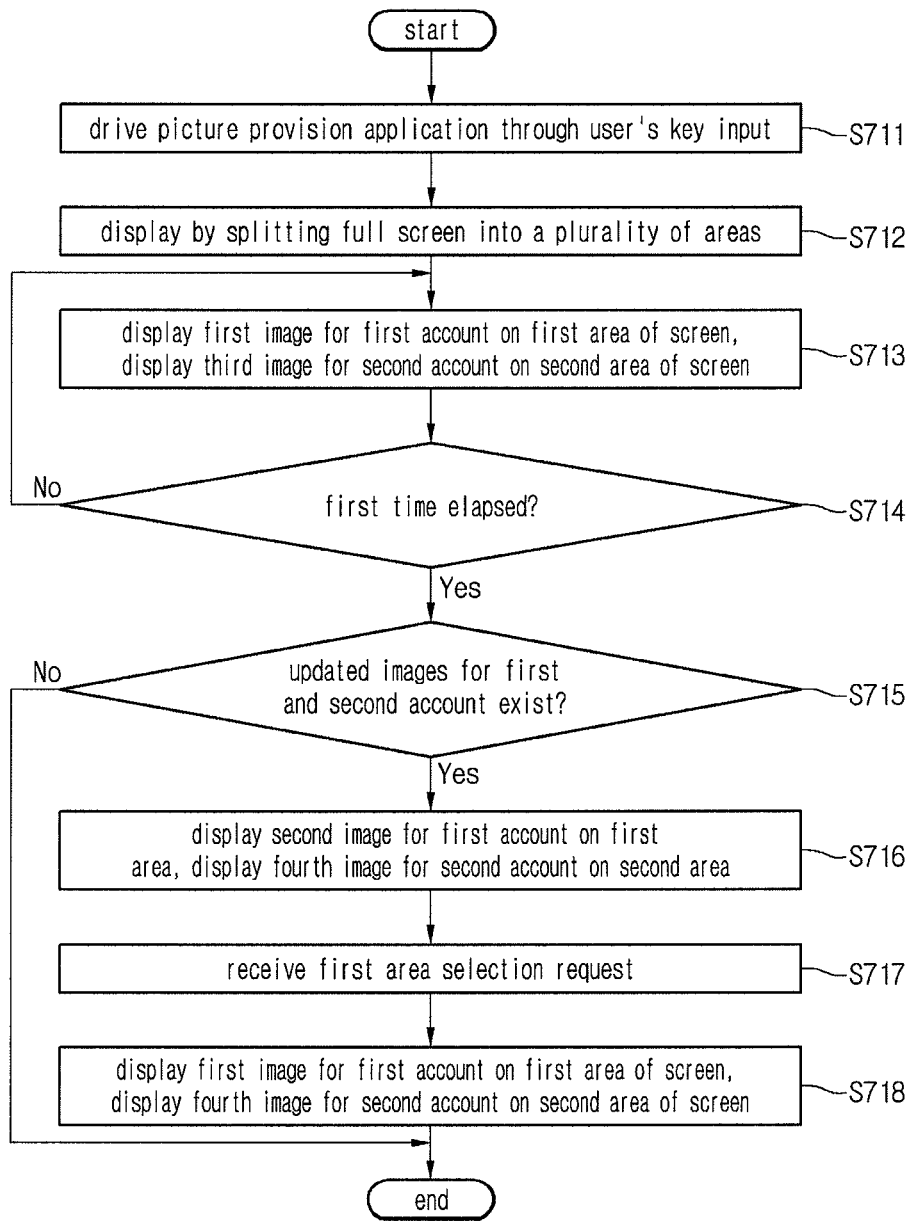
Figure 10:
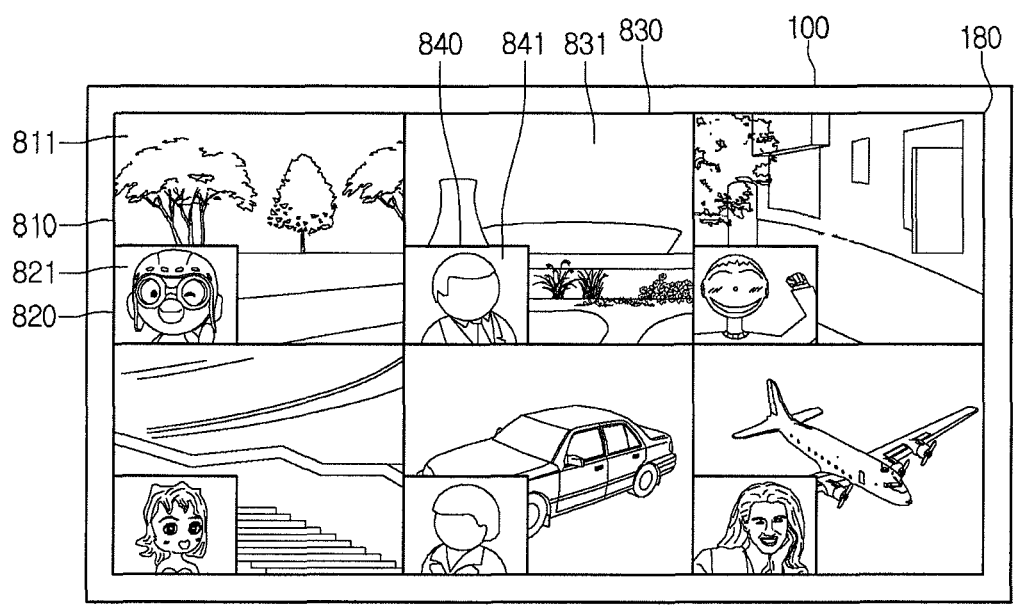
Figure 11:
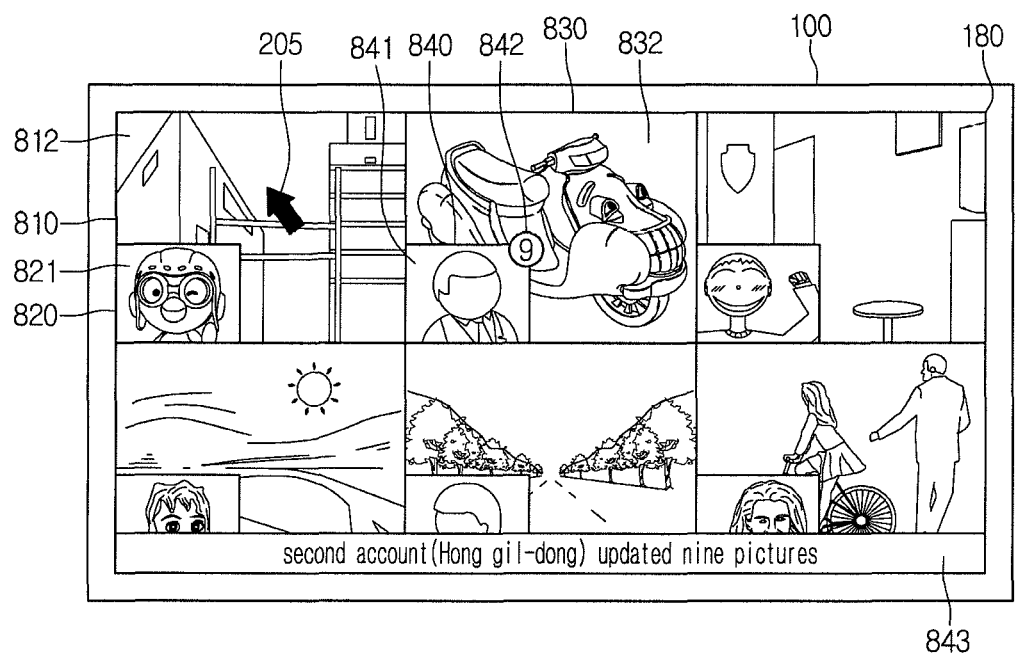
Figure 12:
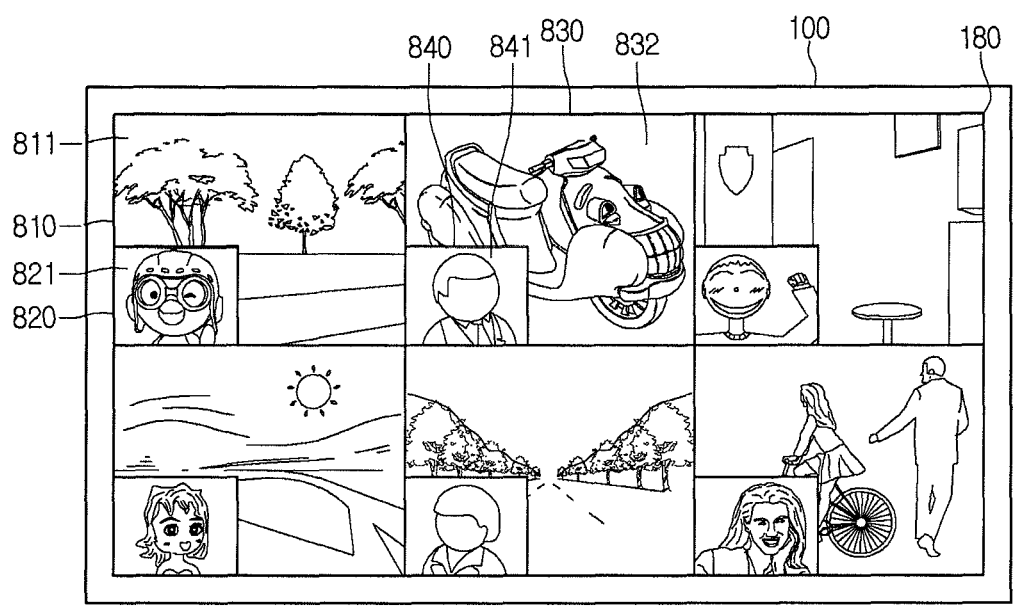

FIG. 9 is a flow chart of the image display method according to another embodiment of the present invention, and FIGS. 10 to 12 are diagrams showing the image display method of the image display apparatus according to this embodiment of the present invention. The method of FIG. 9 is similar to the method of FIG. 7, but when the user selects a specific area displaying a current image among the plurality of divided areas of the screen, the specific area displays the previously displayed image, instead of enlarging the current image.

Referring to FIG. 9, after turning on the image display apparatus 100, the control unit 170 drives a picture provision application through the user input unit (S711). Referring to FIG. 10, the full screen of the display unit 180 may be split and displayed into the plurality of areas according to the driving of the picture provision application (S712).

The first image 811 for the first account among the plurality of accounts may be displayed on the first area 810 of the plurality of areas, and a third image 831 for the second account among the plurality of accounts may be displayed on the second area 830 (S713). The first and second accounts may mean specific peoples as any one of the plurality of accounts registered by a user. The first account image 821 may further be displayed on the portion area 820 of the first area 810, and a second account image 841 may further displayed on a portion area 840 of the second area 830.

The first and second account images 821, 841, which are images uploaded in a social network site (SNS) by the first account and the second account, respectively, may be images for distinguishing that account from other accounts. As mentioned above, the account images 821 and 841 can be images or information associated with the first and second accounts, respectively, and can be used to identify or recognize the accounts by the user of the image display apparatus 100. For instance, an image or picture of the holder of the second account as the second account image 841 may be displayed.

Referring to FIGS. 10 and 11, the control unit 170 can determine whether or not the first time has elapsed in a state where the first image 811 is displayed on the first area 810 and the third image 831 is displayed on the second area 830 (S714). The first time is variable according to the operation of the user input unit in the user setting menu 900. When the first time has elapsed as a result of the determination, the control unit 170 can confirm whether or not any new or updated images from at least one of the first and second accounts exist (S715). If the updated images from at least one of the first and second accounts exist, for instance, the updated image from the first account is displayed as a second image 812 for the first account on the first area 810 and/or the updated image from the second account is displayed as a fourth image 832 for the second account on the second area 830 (S716). After the first time elapsed, the first and second account images 821, 841 may be maintained and displayed on the screen while the second and fourth images 812 and 832 are displayed on the first and second areas 810 and 830.

The update time of the first image 811 may be faster than the update time of the second image 812, and the update time of the third image 831 may be faster than the update time of the fourth image 832. For instance, a sequence that the first image 811 and the second image 812 are displayed may be a sequence uploaded on the social network service (SNS) by the first account, and a sequence that the third image 831 and the fourth image 832 are displayed may be a sequence uploaded on the social network service (SNS) by the second account.

Through the same process as described above, the user may successively confirm images uploaded by the plurality of accounts at one time.

Referring to FIGS. 11 and 12, the user can request a selection of the first area 810 (or the first image) through the user input unit) (S717). The image display apparatus 100, when the selection request is received, may display the first image 811 for the first account on the first area 810 while maintaining the displaying of the fourth image 832 for the second account on the second area 830 (S718). That is, by selecting an area for the account desired to view again, an image may be displayed and confirmed from the beginning, and images of other accounts may be displayed and confirmed with an original sequence. For instance, when the user selects the second image 812 or the first area 810 using the pointer 205 or other means in FIG. 11, the first area 810 returns to display the first image 811 previously displayed as shown in FIG. 12. The other areas of the screen which are not selected, are not affected and maintain their displays.

Referring to FIG. 11, when an updated image for any one of the accounts is received during the displaying of the image for the plurality of accounts on the plurality of areas, information about the received image may be displayed on the display unit 180. For instance, the information about the received image may be an updated image number 842 or a text indication (843) informing of the update. When an image is updated by some accounts in the process where an image for the plurality of accounts is changed, the user can visually understand the update status through the display unit 180.

Figure 13:
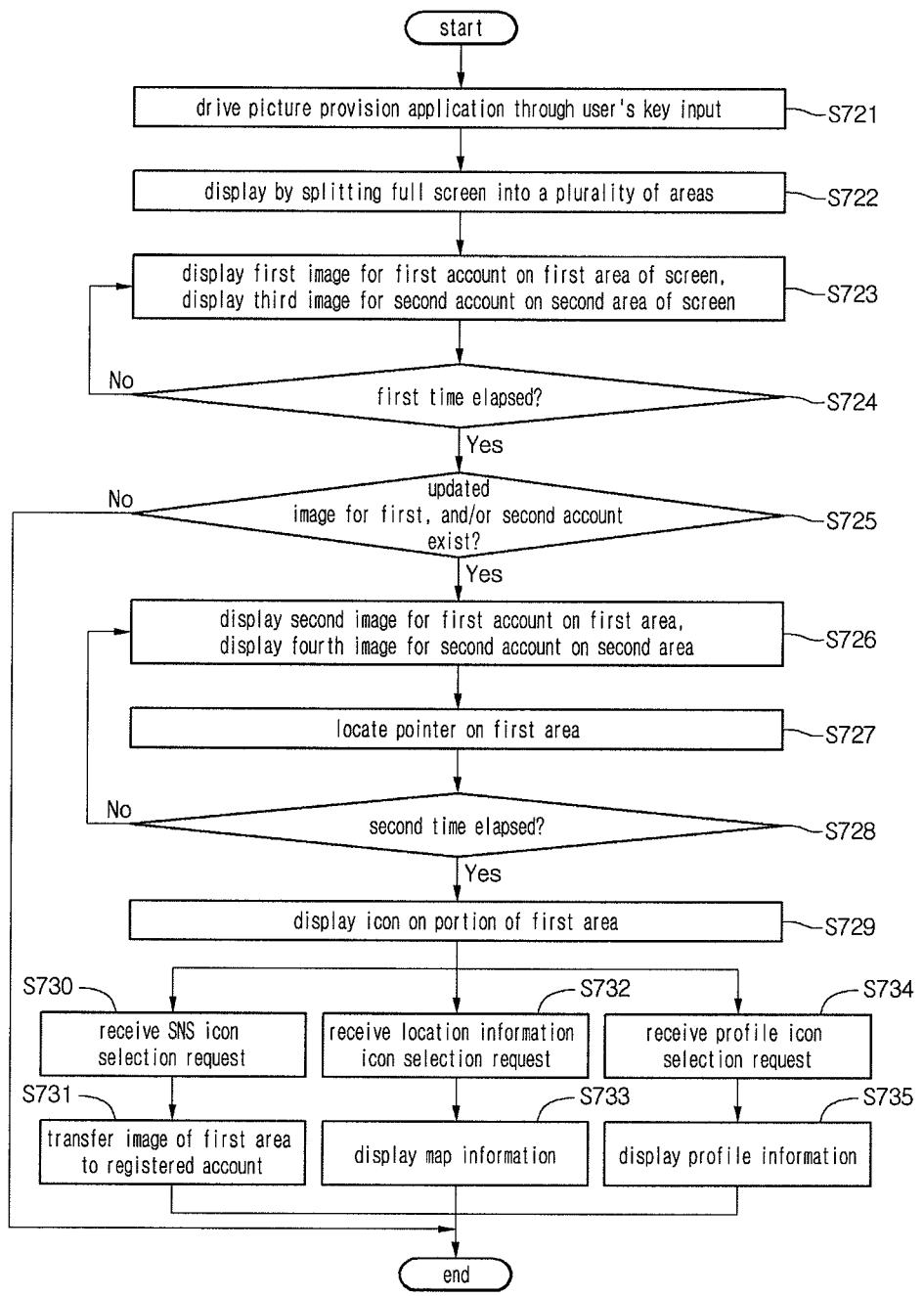

FIG. 13 is a flow chart of the image display method according to another embodiment of the present invention, and FIGS. 14 to 33 are diagrams showing the image display method of the image display apparatus according to this embodiment of the present invention.

After turning on the image display apparatus 100, the control unit 170 drives a picture provision application through the user input unit (S721).

Figure 14:
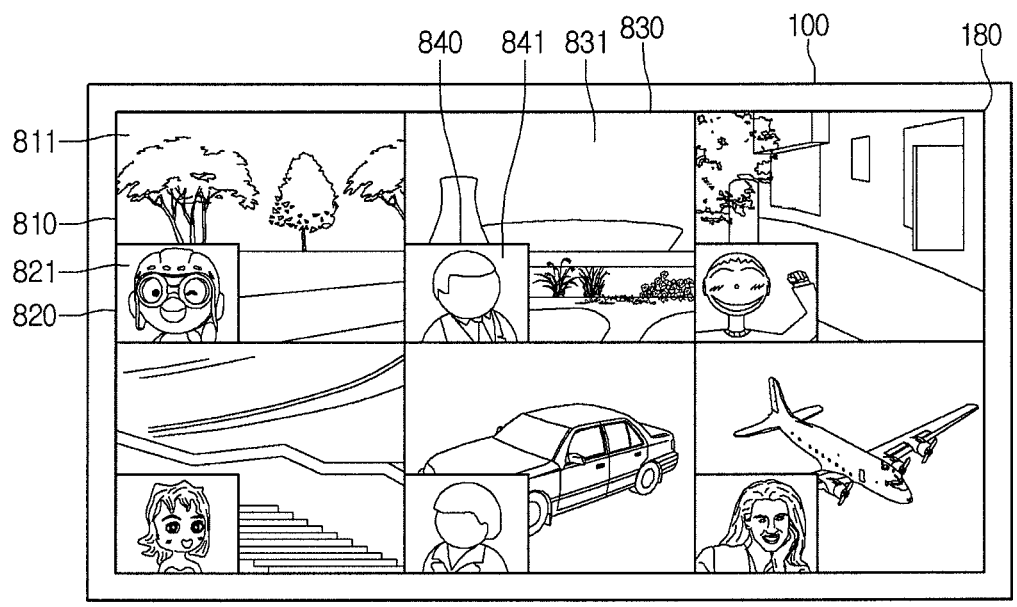

Referring to FIG. 14, the control unit 170 may split and display the full screen of the display unit 180 into the plurality of areas according to the driving of the picture provision application (S722).

The first image 811 for the first account of the plurality of accounts may be displayed on the first area 810 of the plurality of areas, and the third image 831 for the second account of the plurality of accounts may be displayed the second area 830 (S723).

The control unit 170 can determine whether or not the first time has elapsed in a state where the first image 811 is displayed on the first area 810 and the third image 831 is displayed on the second area 830 (S724). The first time is variable according to the operation of the user input unit (not shown) in the user setting menu 900.

When the first time has elapsed as a result of the determination, the control unit 170 can confirm whether or not updated images for at least one of the first and second accounts exist (S725). If the updated images for at least one of the first and second accounts exist, for instance the updated image from the first account is displayed on the first area 810 as the second image 812 and, the updated image from the second account is displayed on the second area 830 as the fourth image 832 (S726).

Figure 15:
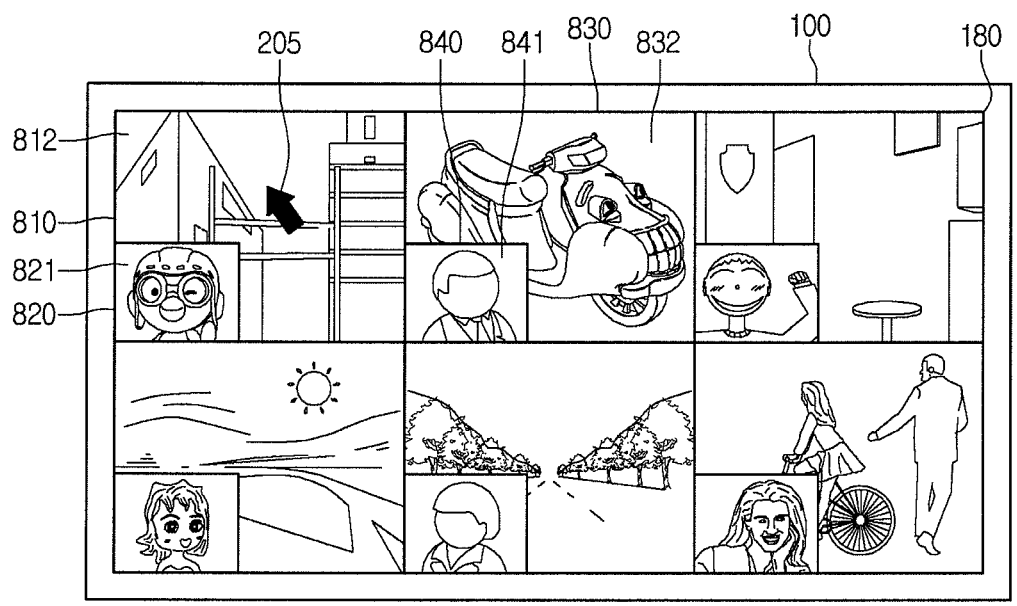

Referring to FIG. 15, the pointer 205 is moved onto the first area 810 corresponding to pointer movement commands of the user in the process where the images for the first and second accounts are displayed on the first and second areas 810, 830 (S727).

Figure 16:
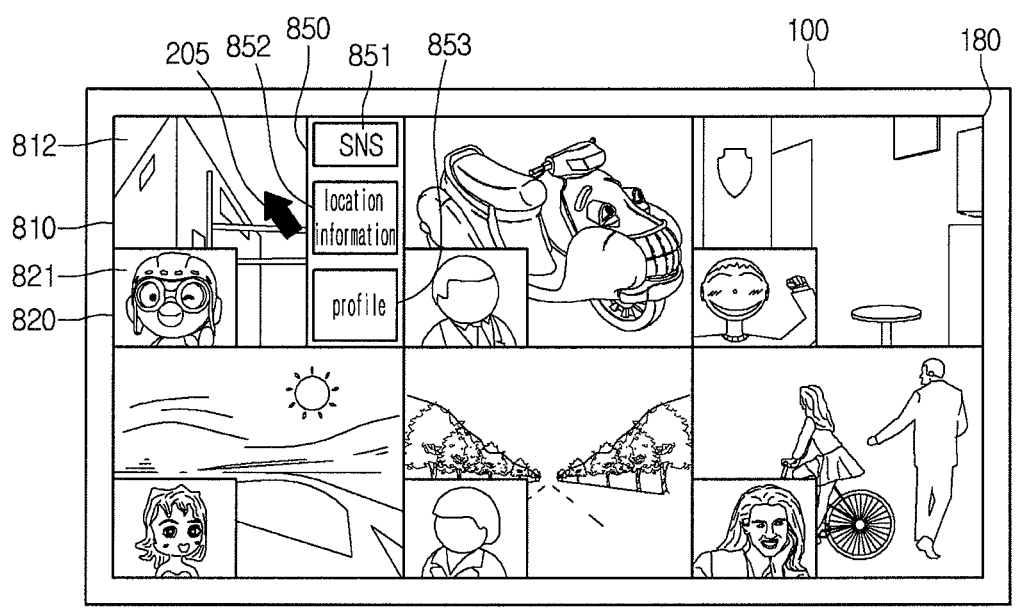

Referring to FIG. 16, the control unit 170 can determine whether or not a second time has elapsed since the pointer 205 has been located on the first area 810 (S728), and after the second time has elapsed, at least one of icons may be displayed on a portion area 850 of the first area 810 (S729). The second time is variable according to the operation of the user input unit in the user setting menu 900. The second time can the same as or different from the first time. Here, after the second time duration has elapsed since the icon 205 has been positioned on the first area 810, the control unit 170 may automatically display at least one of the icons. The icons displayed on the portion area 850 of the first area 810 may include a social network service (SNS) icon 851, location information icon 852, and a profile icon 853. One or more of such icons may be displayed simultaneously on the first area 810 depending on the configuration.

Figure 17:
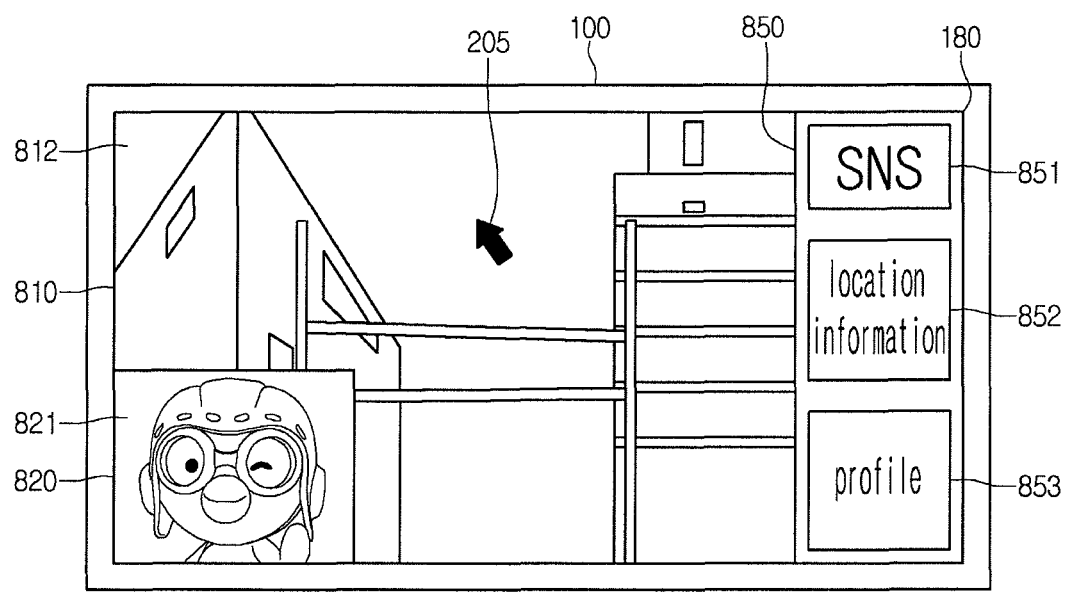

Referring to FIG. 17, even in a state where the first area 810 is enlargedly displayed as the full screen, after the pointer 205 is located, at least any one of the icons may be displayed on the enlarged portion area 850 when the second time has elapsed. For instance, if the user selects the first area 810 using the pointer 205 before the second time elapses (without the icons 851, 852, 853 being displayed as shown in FIG. 15), then the selected first area may be enlarged and the image thereof may be displayed on the entire screen. Then, if the second time elapses after the enlargement of the first area, then the icon(s) 851, 852, 853 may be displayed on the portion area 8510 as shown in FIG. 17. As a variation, if the user selects the first area 810 with the icons 851, 852, 853 being displayed as shown in FIG. 16, then the image of the first area 810 including the icons 851, 852 and 853 are displayed on the entire screen as shown in FIG. 17.

Figure 18:
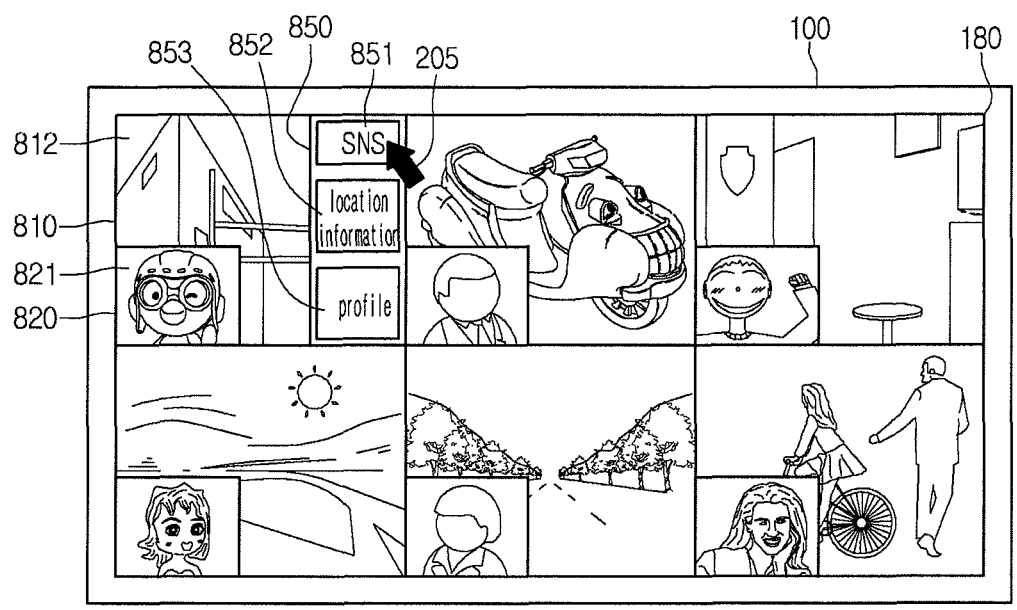
Figure 19:
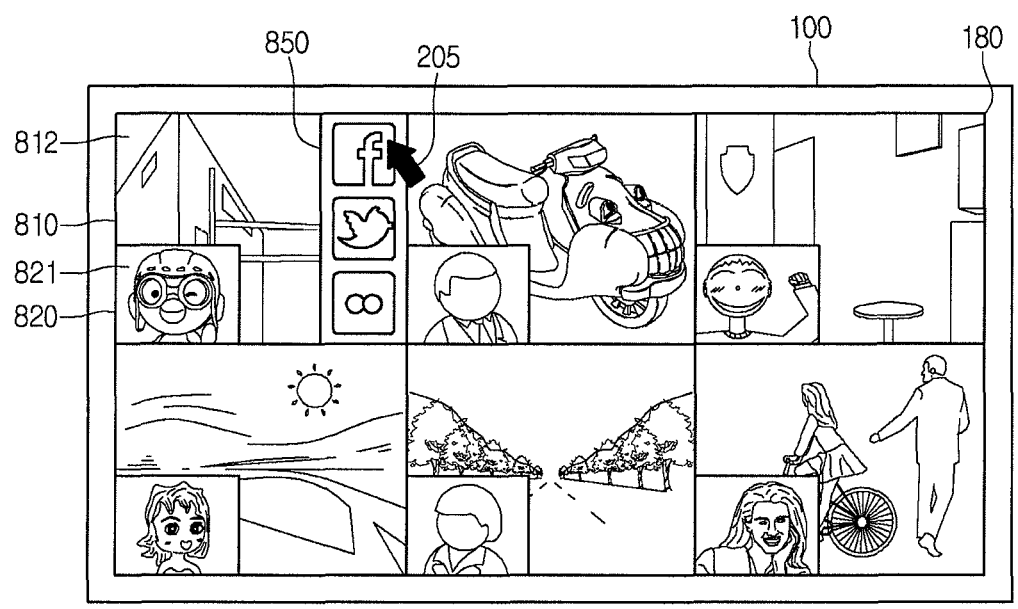

Referring to FIGS. 18 and 19, when the image display apparatus 100 receives a selection request for the social network service (SNS) icon 851 through the user input unit (S730), a plurality of icons of the social network service (SNS) may be displayed on the portion area 850 of the first area 810. The user may select any one of the plurality icons of the social network service (SNS) and, an image 812 displayed on the first area 810 may be transmitted to an account registered by the user through the SNS (S731). For instance, by selecting a particular social network among the SNS icons displayed on the portion area 850 of FIG. 19, the control unit 170 automatically sends the currently displayed image 812 of the first area 810 to an account pre-associated with the selected particular social network so that such image can be stored or displayed on the selected particular social network website.

Figure 20:
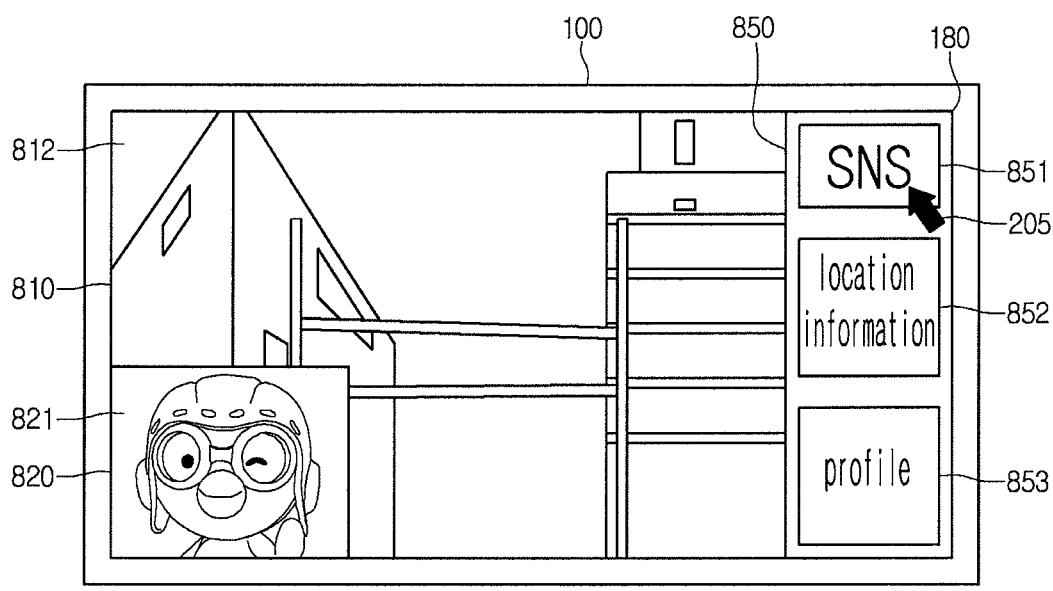
Figure 21:
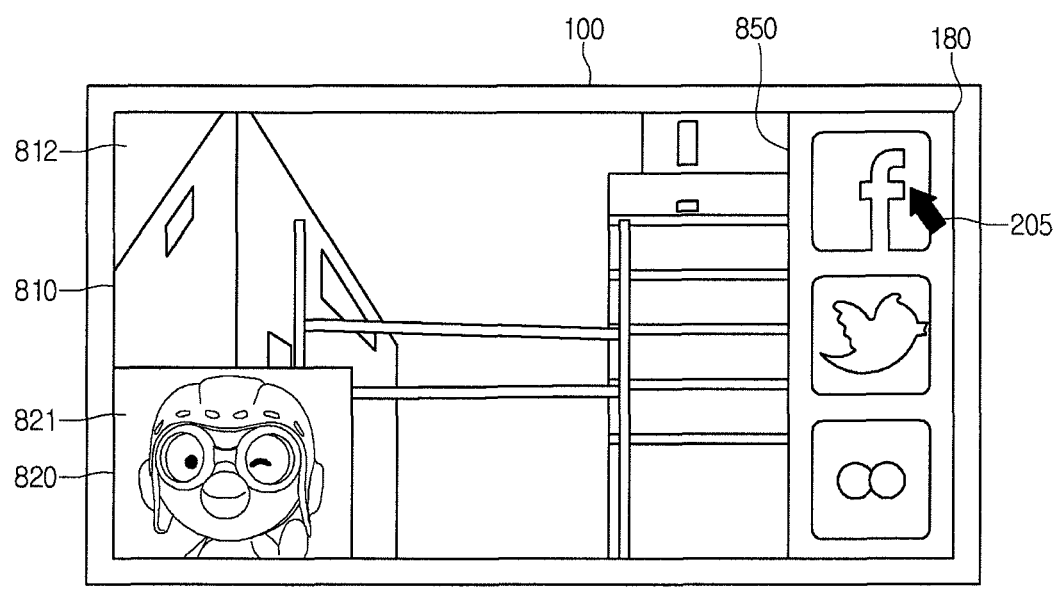

Referring to FIGS. 20 and 21, even in a state where the first area 810 is enlargedly displayed as the full screen, after the pointer 205 is located, at least any one of the icons 851, 852, 853 may be displayed on the portion area 850 of the first area 810, and the icon 851 of the social network service (SNS) may be selected through the user input unit when the second time has elapsed. The user may select any one of the plurality icons of the social network service (SNS) and the image 812 displayed on the first area 810 may be transmitted to the account registered by the user as discussed in association with FIG. 19.

Figure 22:
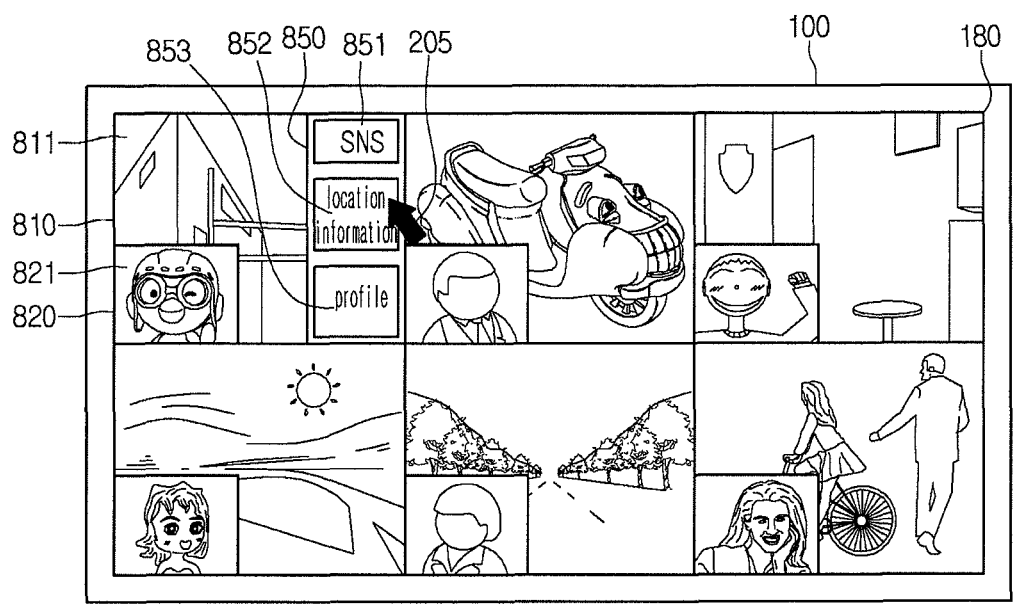
Figure 23:
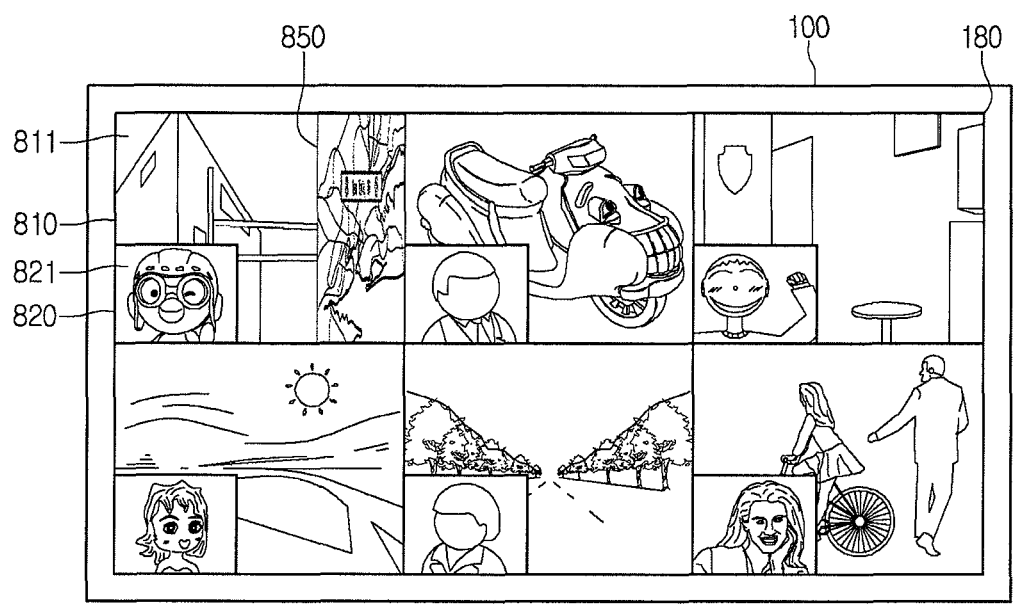
Figure 24:
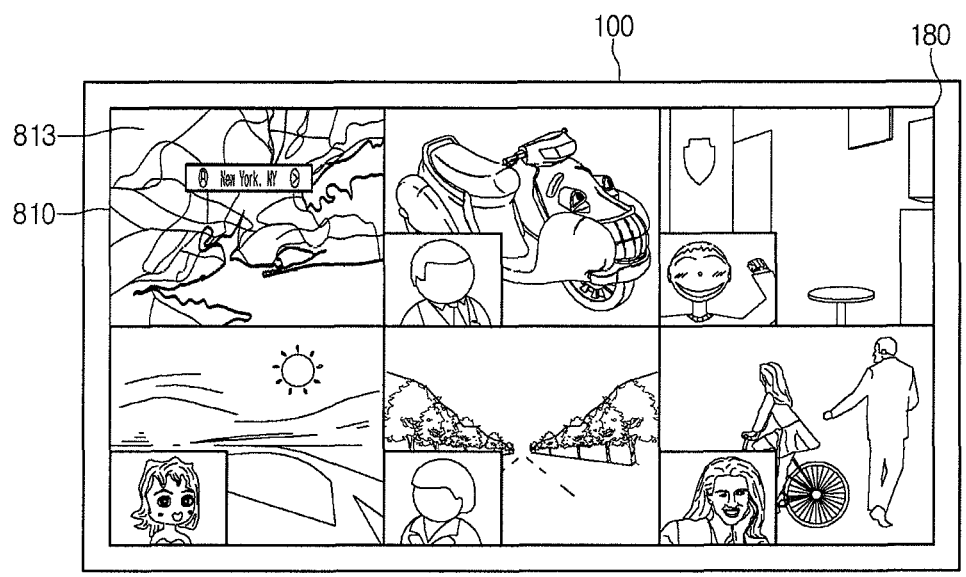

Referring to FIGS. 22 and 24, when the image display apparatus 100 receives the selection request of the location information con 852 through the user input unit (S732), the location information for the first image 811 displayed on the first area is received. For instance, map information corresponding to the received location information may be displayed (S733). The map information may be displayed on any one of the portion area 850 of the first area 810 or the full area of the first area 810. The location information for the first image 811 may provide a location of the displayed first image 811. For instance, if the first image 811 is an image of a particular building, then the location information can be the physical location of that building. Depending on the image 811, the image 811 may or may not have the associated location information.

Figure 25:
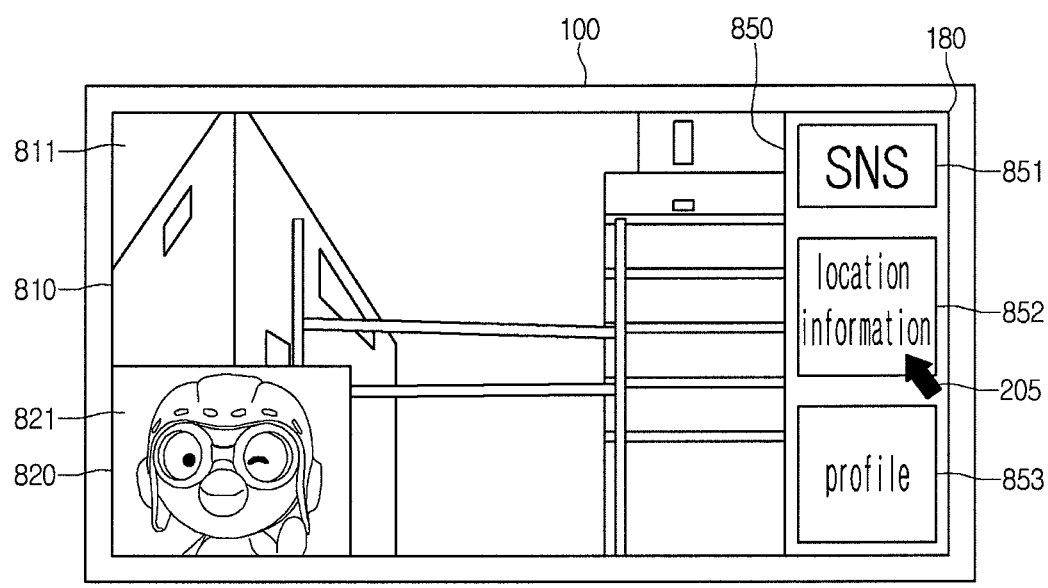
Figure 26:
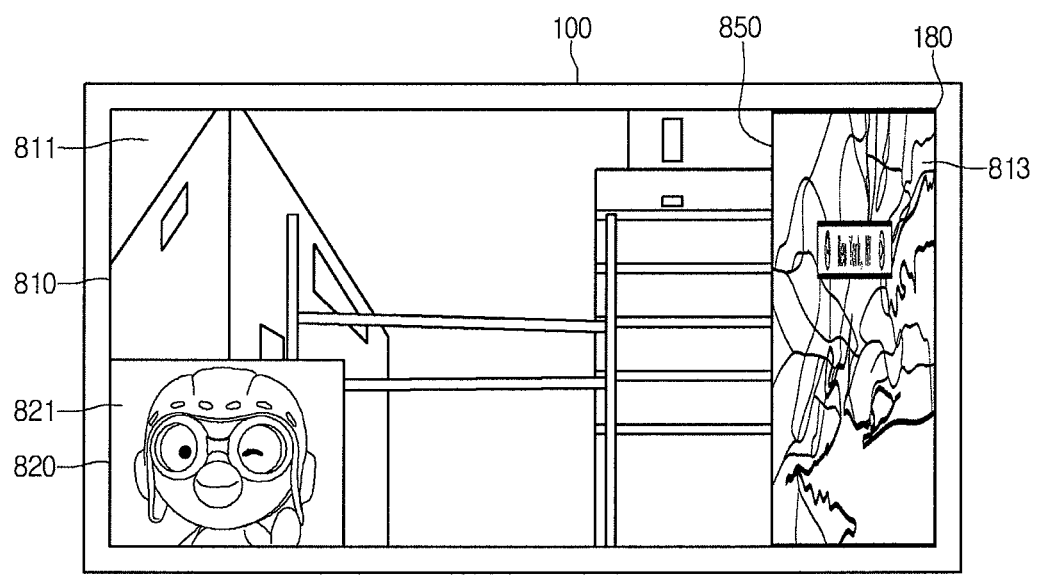
Figure 27:
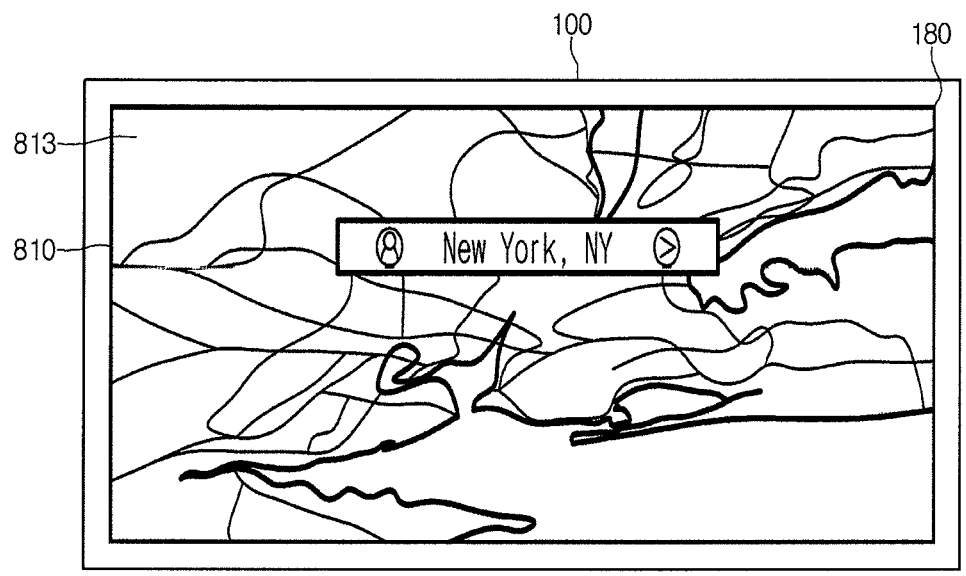

Referring to FIGS. 25 to 27, even in a state where the first area 810 is enlargedly displayed as the full screen, the operation as described above in FIGS. 23 and 24 can be performed.

Figure 28:
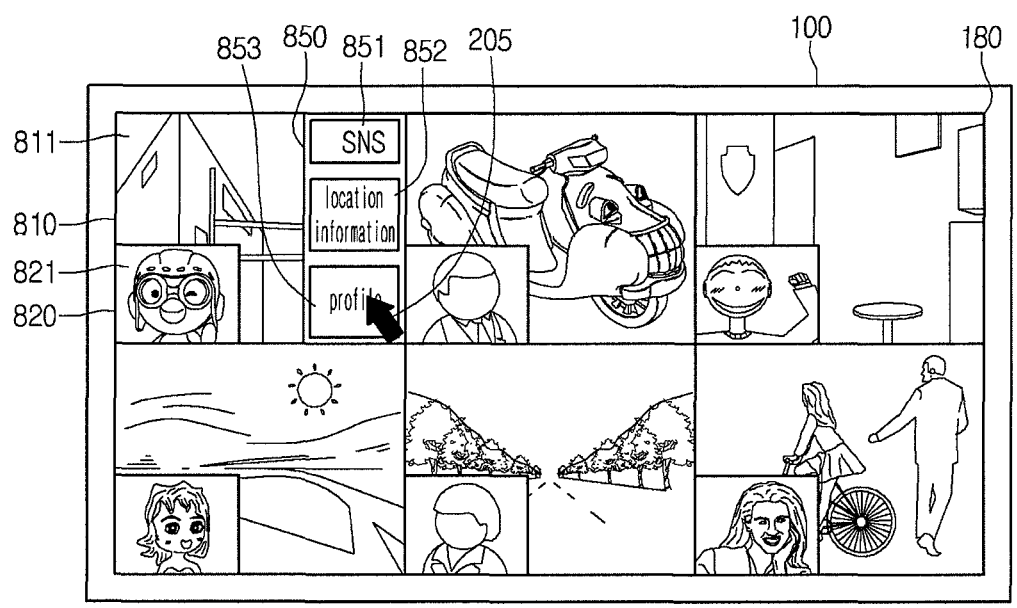
Figure 29:
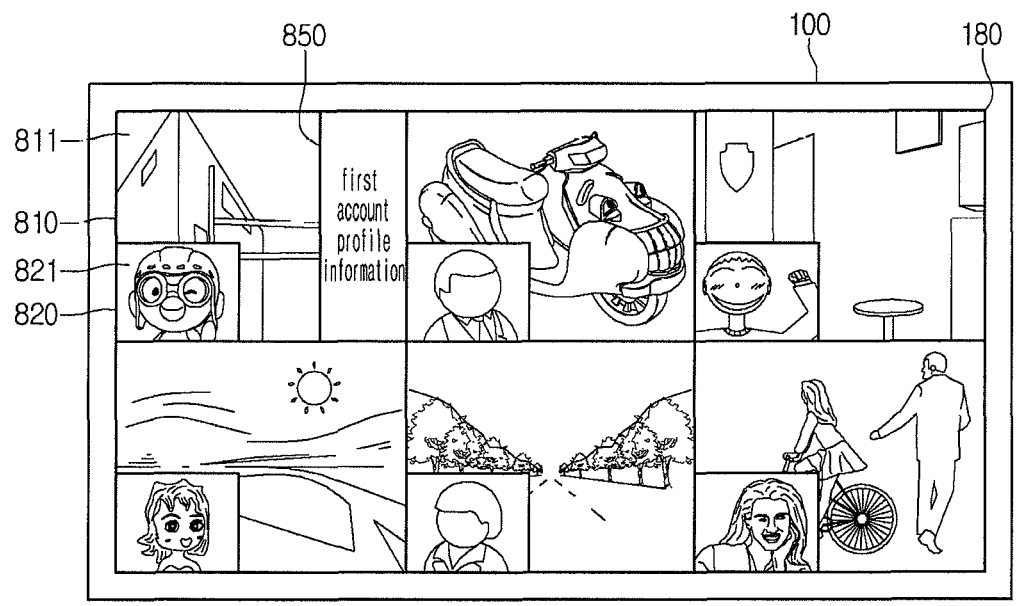
Figure 30:
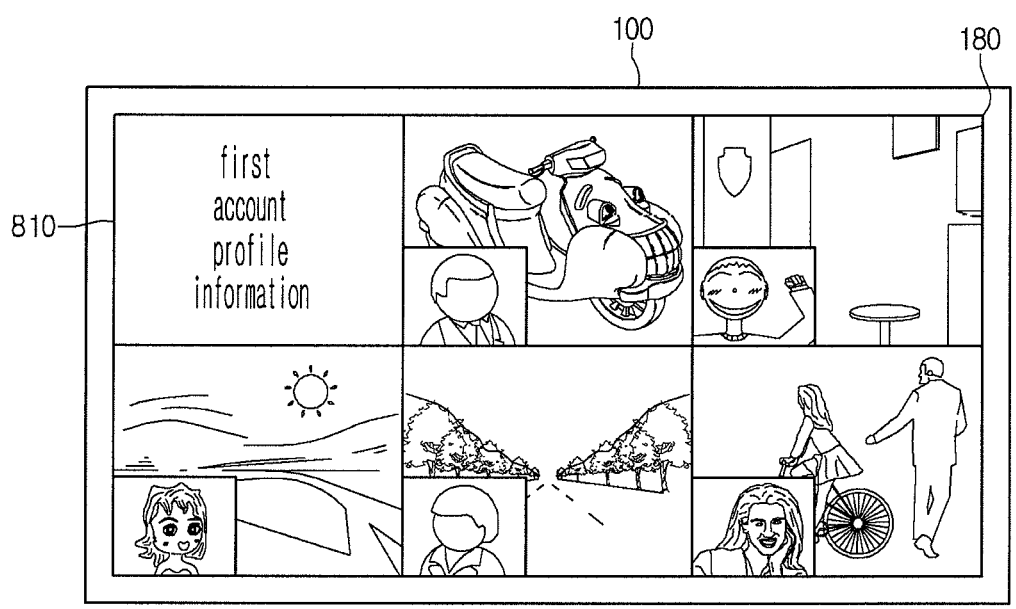

Referring to FIGS. 28 to 30, when the image display apparatus 100 receives the selection request of the profile con 853 through the user input unit (S734), the profile information of the first account for the first image 810 may be displayed (S735). The profile information may include information such as a name, a date of birth, an occupation, a level of education, interests, and the like as the information about the profile of the specific account/account holder. The profile information may be displayed on any one of the portion area 850 of the first area 810 or the full area of the first area 810.

Figure 31:
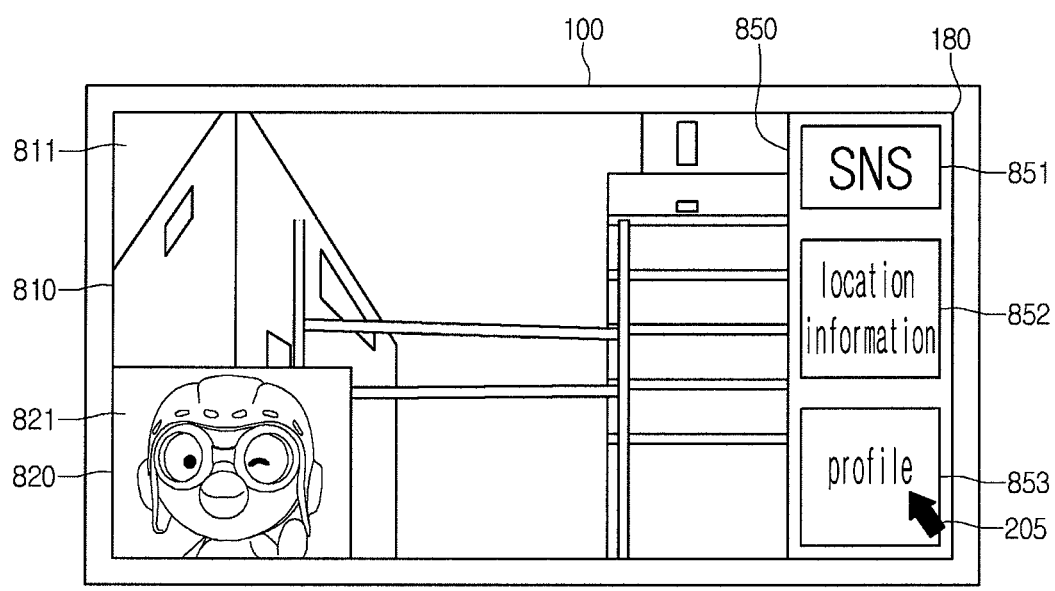
Figure 32:
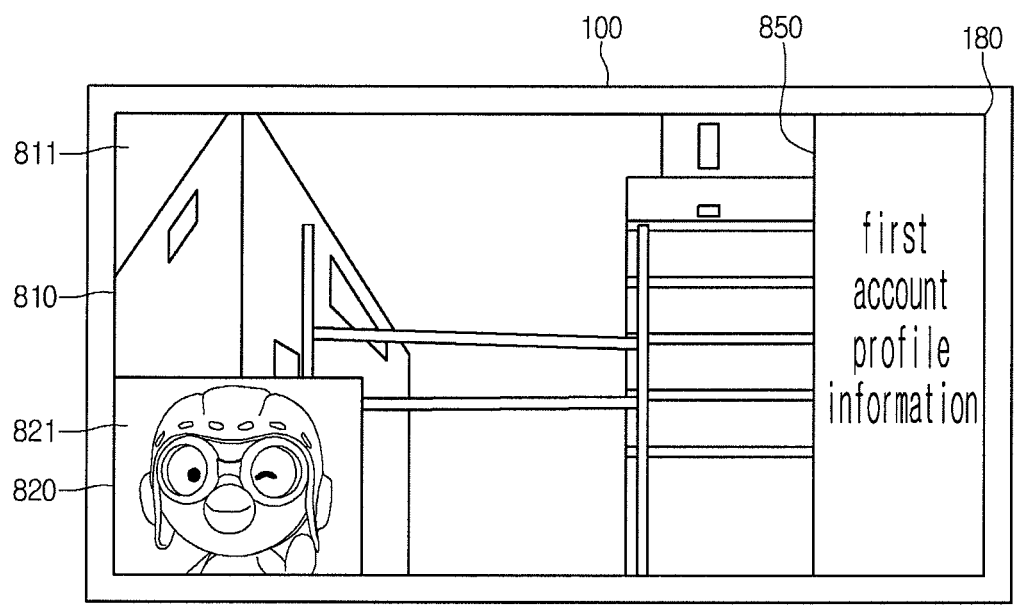
Figure 33:
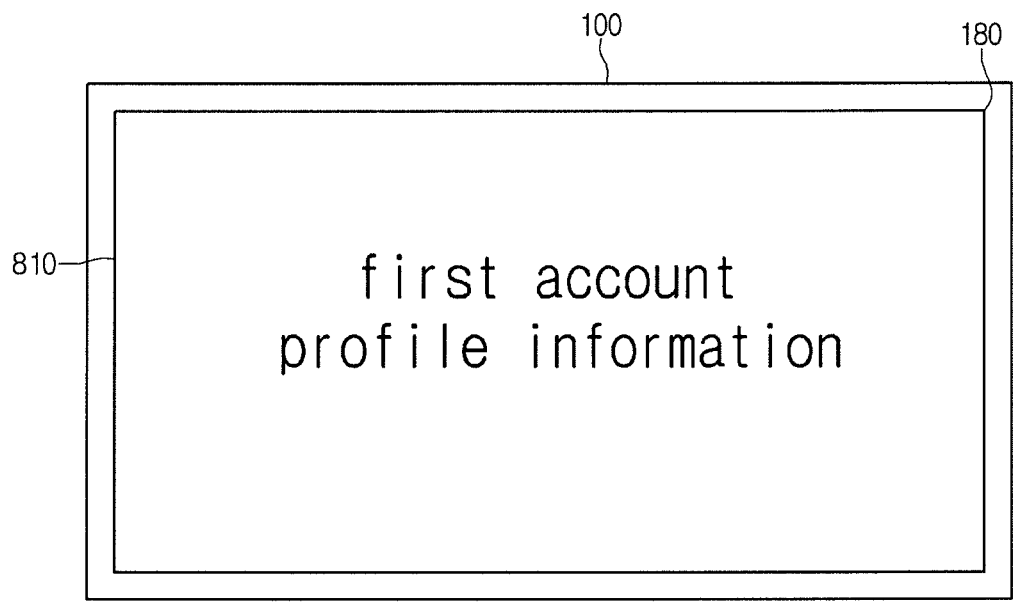

Referring to FIGS. 31 to 33, even in a state where the first area 810 is enlargedly displayed as the full screen, the operation as described above in FIGS. 29 and 30 can be performed.

FIG. 34 is a diagram showing a user's setting menu for controlling the operations of the image display methods of the present invention. The user setting menu 900 may be displayed on the screen of the display unit 180.

The user setting menu 900 may include an array sequence list 910 of the plurality of accounts, an area number list 920, an image conversion time list 930 and a pointer location time list 940. The user may arrange and set the array sequence list 910 on the display unit 180 of the image display apparatus 100 by selecting a desired group of groups in which a plurality of accounts are included, through the user input unit. For example, when selecting a group in which the image is updated frequently, images from the frequently updated account may be arranged on the display unit 180. The user can assign and change which account would be displayed in which area among the divided areas of the screen.

In addition, the user can split the screen displayed on the display unit 180 into any desired number of areas by adjusting the number of ways the screen can be divided into. For instance, the user can confirm images through the display unit 180 by adjusting the number of the areas by the number of desired accounts. By setting the area number 920 to be '6' in the example of FIG. 34, the screen of the display unit 180 is split into 6 different areas as shown in FIG. 5.

In addition, the user can adjust a time in which the image indication is changed from the plurality of areas through the image conversion time list 930, and adjust the displaying of the plurality of icons when the pointer is located on a specific area for the some time through the pointer location time list 940. For instance, the first time mentioned above may correspond to the image conversion time identified on the list 930, and the second time mentioned above may correspond to the pointer location time identified on the list 940. Any of the items on the menu 900 may modified by the user, or can be overridden by the control unit 170 if necessary.

Accordingly, an intuitive and simple interface may be provided to the user through the user setting menu 900.

Although preferred embodiments of the present invention have been illustrated and described, the present invention is not limited to the above-mentioned embodiments and various modified embodiments can be available by those skilled in the art without the scope of the appended claims of the present invention. In addition, these modified embodiments should not be appreciated separately from technical spirits or prospects.

What is claimed is:

1. An image display method for displaying pictures uploaded by a plurality of different Social Network Service (SNS) accounts set up under a SNS on a display unit of an image display apparatus, the method comprising:

displaying a plurality of areas on a screen of the display unit by splitting the entire screen of the display unit into the plurality of areas;

displaying first SNS account information for identifying a first SNS account among the plurality of different SNS accounts on a portion area of a first area among the displayed plurality of areas on the screen;

displaying a first picture from the first SNS account on an entire portion of the first area, while the first SNS account information is displayed on a portion of the first picture;

determining, by the apparatus, whether or not an updated picture from the first SNS account exists, after a first predetermined time has elapsed since the first picture has been displayed;

displaying the updated picture as a second picture for the first SNS account on the first area when the updated picture exists;

determining, by the image display apparatus, whether or not a second predetermined time has elapsed since a pointer has been located on the first area;

displaying a list of selectable menu items associated with the first or second picture currently displayed on the first area of the screen, when the second predetermined time has elapsed;

when one of the selectable menu items is selected, displaying information requested by the selected menu item with the first or second picture on the portion area of the first area or on the entire portion of the first area, or when one of the selectable menu items is selected, displaying information requested by the selected menu item on the portion area of the first area or on the entire portion of the first area; and when one of an icon of an SNS associated with one of the selectable menu items is selected, transmitting the currently displayed picture on the first area to an account pre-associated with the selected icon, wherein the first predetermined time and the second predetermined time are recorded in a time list, and the time list is changed by a user.

2. The image display method according to claim 1, further comprising:

repeatedly displaying the first and second pictures in a sequence.

3. The image display method according to claim 1, further comprising:

displaying second SNS account information for identifying a second SNS account among the plurality of different SNS accounts on a portion area of a second area among the displayed plurality of areas on the screen; and displaying a third picture from the second SNS account on the second area, while the second SNS account information is displayed on the portion area of the second area, wherein the first picture and the third picture are displayed during a same time.

4. The image display method according to claim 1, further comprising:

enlarging the first area to correspond substantially to the entire screen and displaying the enlarged first area on the screen, when a user's selection of the displayed first area is received.

5. The image display method according to claim 4, wherein the displaying step displays the list of selectable menu items associated with the first or second picture currently displayed on the enlarged first area displayed on the entire screen, according to the user's selection.

6. The image display method according to claim 5, wherein the list of selectable menu items includes at least one of a SNS request, a location information request, and a profile request.

7. The image display method according to claim 1, wherein the list of selectable menu items is displayed according to a user's request.

8. The image display method according to claim 1, wherein the list of selectable menu items includes at least one of a SNS request, a location information request, and a profile request.

9. The image display method according to claim 1, wherein the first predetermined time is variable according to a user's setting.

10. The image display method according to claim 1, wherein the first SNS account is variable according to a user's setting.

11. The image display method according to claim 1, further comprising:

displaying information about the updated picture when the updated picture as the second picture is displayed.

12. The image display method according to claim 11, wherein the information about the updated picture includes information identifying the number of pictures associated with the updating.

13. An image display apparatus for displaying pictures provided by a plurality of different Social Network Service (SNS) accounts set up under a SNS, the image display apparatus comprising:

a display unit including a screen; and a control unit configured to control the display unit and to:

display a plurality of areas on the screen of the display unit by splitting the entire screen of the display unit into the plurality of areas;

display first SNS account information for identifying a first SNS account among the plurality of different SNS accounts on a portion area of a first area among the displayed plurality of areas on the screen;

display a first picture from the first SNS account on an entire portion of the first area, while the first SNS account information is displayed on a portion of the first picture;

display first SNS account information of the first SNS account with the first picture, on the first area of the screen;

determine whether or not an updated picture from the first SNS account exists, after a first predetermined time has elapsed since the first picture has been displayed;

display the updated picture as a second picture for the first SNS account on the first area when the updated picture exists; and determine whether or not a second predetermined time has elapsed since a pointer has been located on the first area, wherein the control unit is further configured to display a list of selectable menu items associated with the first or second picture currently displayed on the first area of the screen, when the second predetermined time has elapsed, wherein the control unit is further configured to:

when one of the selectable menu items is selected, display information requested by the selected menu item with the first or second picture on the portion area of the first area or on the entire portion of the first area, or when one of the selectable menu items is selected, display information requested by the selected menu item on the portion area of the first area or on the entire portion of the first area, and when one of an icon of an SNS associated with one of the selectable menu items is selected, transmit the currently displayed picture on the first area to an account pre-associated with the selected icon, and wherein the first predetermined time and the second predetermined time are recorded in a time list, and the time list is changed by a user.

14. The image display apparatus according to claim 13, wherein the control unit is further configured to control the display unit to repeatedly display the first and second pictures in a sequence.

15. The image display apparatus according to claim 13, wherein the control unit is further configured to:
display second SNS account information for identifying a second SNS account among the plurality of different SNS accounts on a portion area of a second area among the displayed plurality of areas on the screen; and
display a third picture from the second SNS account on the second area, while the second SNS account information is displayed on the portion area of the second area,
wherein the first picture and the third picture are displayed during a same time.

16. The image display apparatus according to claim 13, wherein the control unit is further configured to enlarge the first area to correspond substantially to the entire screen and display the enlarged first area on the screen, when a user's selection of the displayed first area is received.

17. The image display apparatus according to claim 16, wherein the control unit is configured to display the list of selectable menu items associated with the first or second picture currently displayed on the enlarged first area displayed on the entire screen, according to the user's selection.

18. The image display apparatus according to claim 17, wherein the list of selectable menu items includes at least one of a SNS request, a location information request, and a profile request.

19. The image display apparatus according to claim 13, wherein the list of selectable menu items is displayed according to a user's request.

20. The image display apparatus according to claim 13, wherein the list of selectable menu items includes at least one of a SNS request, a location information request, and a profile request.

21. The image display apparatus according to claim 13, wherein the first predetermined time is variable according to a user's setting.

22. The image display apparatus according to claim 13, wherein the first SNS account is variable according to a user's setting.

23. The image display apparatus according to claim 13, wherein the control unit is further configured to display information about the updated picture when the updated picture as the second picture is displayed.

24. The image display apparatus according to claim 23, wherein the information about the updated picture includes information identifying the number of pictures associated with the updating.

* * * * *